(12) United States Patent
Hamada

(10) Patent No.: US 9,141,601 B2
(45) Date of Patent: Sep. 22, 2015

(54) LEARNING DEVICE, DETERMINATION DEVICE, LEARNING METHOD, DETERMINATION METHOD, AND COMPUTER PROGRAM PRODUCT

(75) Inventor: Shinichiro Hamada, Kanagawa (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 604 days.

(21) Appl. No.: 13/303,258

(22) Filed: Nov. 23, 2011

(65) Prior Publication Data

US 2012/0183935 A1    Jul. 19, 2012

(30) Foreign Application Priority Data

Jan. 18, 2011    (JP) ................. 2011-007663

(51) Int. Cl.
    *G06F 17/27*    (2006.01)
    *G10L 15/00*    (2013.01)
    *G10L 15/18*    (2013.01)

(52) U.S. Cl.
    CPC .................. *G06F 17/2755* (2013.01)

(58) Field of Classification Search
    USPC ............................................ 704/9
    See application file for complete search history.

(56) References Cited

U.S. PATENT DOCUMENTS

| | | | |
|---|---|---|---|
| 6,199,037 B1 * | 3/2001 | Hardwick | 704/208 |
| 6,343,266 B1 * | 1/2002 | Paul et al. | 704/9 |
| 7,587,389 B2 * | 9/2009 | Sugihara et al. | 1/1 |
| 8,265,925 B2 * | 9/2012 | Aarskog | 704/9 |
| 8,463,593 B2 * | 6/2013 | Pell et al. | 704/9 |
| 2005/0049852 A1 * | 3/2005 | Chao | 704/9 |
| 2009/0076799 A1 * | 3/2009 | Crouch et al. | 704/9 |
| 2009/0326919 A1 * | 12/2009 | Bean | 704/9 |
| 2010/0195909 A1 * | 8/2010 | Wasson et al. | 382/176 |

FOREIGN PATENT DOCUMENTS

| | | |
|---|---|---|
| JP | 2003-122750 | 4/2003 |
| JP | 2005-292958 | 10/2005 |

OTHER PUBLICATIONS

Soon et al, "A Machine Learning Approach to Coreference Resolution of Noun Phrases", 2001, In Association for Computational Linguistics, pp. 521-544.*

(Continued)

*Primary Examiner* — Olujimi Adesanya
(74) *Attorney, Agent, or Firm* — Amin, Turocy & Watson, LLP

(57) ABSTRACT

According to one embodiment, a learning device includes an input receiving unit, an inferring unit, and a learning unit. The input receiving unit receives an input of first data representing a sentence, rear boundaries of elements having an anaphoric relation within the sentence, and a correspondence relation between a first element that is an antecedent and a second element that is an anaphor. The inferring unit infers a range of the first element and a range of the second element that are determined by front boundaries and the rear boundaries by inferring the front boundaries of the first element and the second element based on the first data and a predetermined rule. The learning unit learns criteria used for determining whether or not there is the anaphoric relation in an arbitrary sentence based on the range of the first element and the range of the second element.

8 Claims, 12 Drawing Sheets

(56) References Cited

OTHER PUBLICATIONS

Yang et al, "Coreference Resolution Using Competition Learning Approach", 2003, In ACL '03: Proceedings of the 41st Annual Meeting on Association for Computational Linguistics, pp. 176-183.*

Yang et al, "Improving pronoun resolution by incorporating coreferential information of candidates", 2004, In Proceedings of ACL. (2004), pp. 127-134.*

Iida et al, "Incorporating contextual cues in trainable models for coreference resolution", 2003, In Proceedings of the $10^{th}$ EACL Workshop on The Computational Treatment of Anaphora, pp. 23-30.*

Japanese Office Action for Japanese Application Serial No. 2011-007663 mailed on Oct. 30, 2012.

Notification of the Third Office Action for Chinese Patent Application No. 201110414927.6 dated Mar. 4, 2015, 9 pages.

* cited by examiner

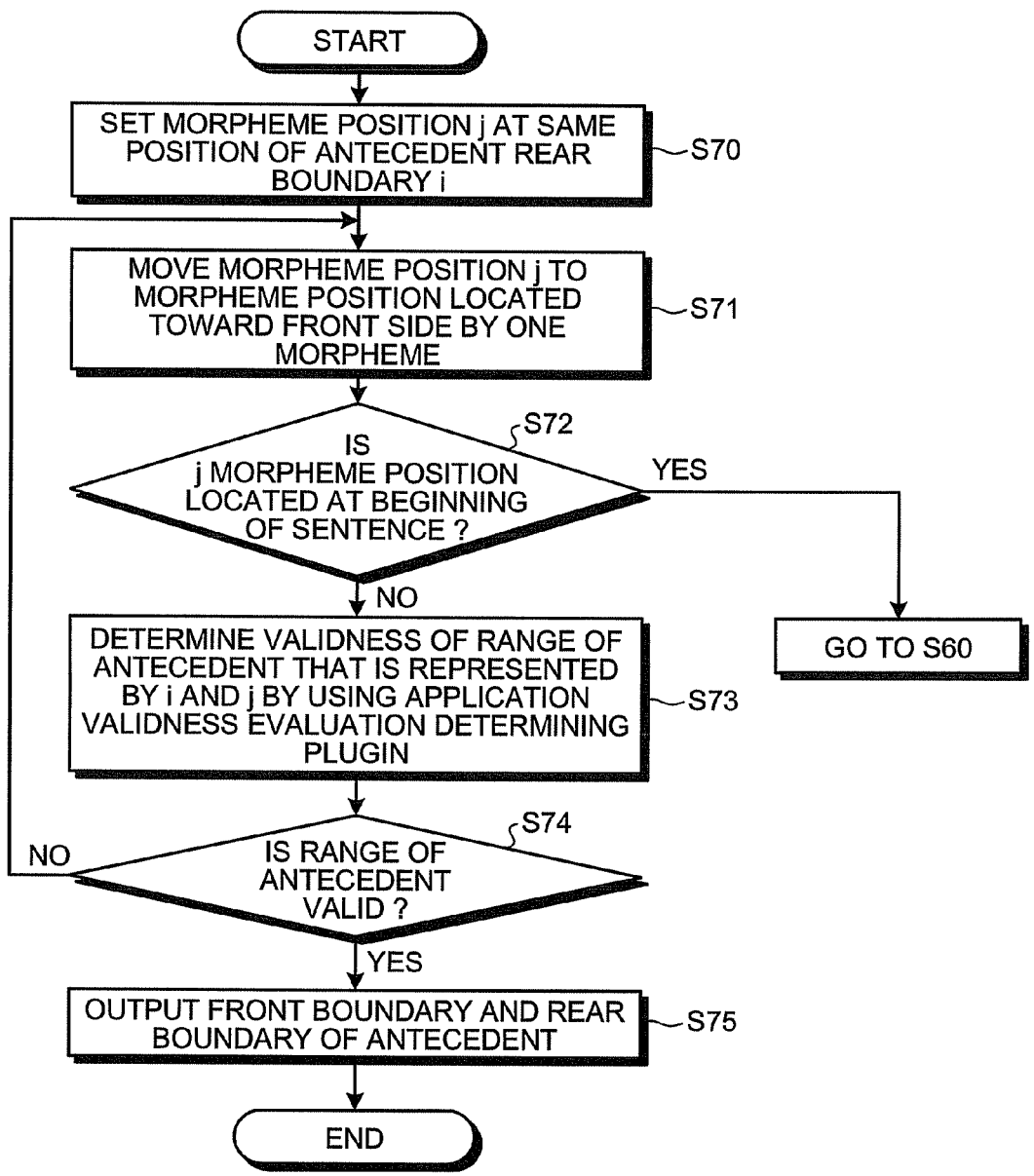

LEARNING DEVICE, DETERMINATION DEVICE, LEARNING METHOD, DETERMINATION METHOD, AND COMPUTER PROGRAM PRODUCT

CROSS-REFERENCE TO RELATED APPLICATION

This application is based upon and claims the benefit of priority from Japanese Patent Application No. 2011-007663, filed on Jan. 18, 2011; the entire contents of which are incorporated herein by reference.

FIELD

Embodiments described herein relate generally to a learning device, a determination device, a learning method, a determination method, and a computer program product.

BACKGROUND

Coreference is a linguistic phenomenon in which a set of elements (referred to as constituent elements) constituting a sentence represents the same entity within the sentence. In the set, the constituent element that is positioned at the rearmost position is referred to as anaphor, and the other constituent elements are referred to as antecedents. A program (module) that is used for performing a process (referred to as a coreference analysis) of finding such sets is called a coreference analyzer. The phenomena of the coreference include, based on the type of constituent elements, coreference of noun phrases, coreference of predicates, coreference of sentences, and coreference over different types of constituent elements, and the like. Hereinafter, for the simplification of description, only nouns (noun phrases) are assumed to be handled as constituent elements to be found as coreference targets. It is easy to expand a coreference analyzer that is based on noun phrases so as to handle other types of constituent elements as well.

Generally, a coreference analyzer performs a learning process and a determination process. In the learning process, the coreference analyzer acquires criteria used for assigning a tag group, which represents a coreference set, by referring to data (referred to as training data) that represents a sentence to which tags representing coreference sets are manually assigned in advance. In the determination process, the coreference analyzer determines whether or not there is a coreference relation by applying the criteria acquired in the learning process for an ordinary sentence (text) to which tags representing coreference sets have not been assigned and for plural noun phrases for which a user desires to know whether or not there is a coreference relation within the text.

The training data, essentially, includes tags representing noun phrases as constituent elements forming a coreference set in the sentence and tags representing whether or not the noun phrases represent the same entity. Accordingly, a correspondence relation (link) between a noun phrase and another noun phrase can be specified. Such training data is data that represents the coreference phenomenon as tags straightforwardly.

One example of the representation method of the training data is shown below. A range enclosed by "< >" is a noun phrase that is designated as a coreference set. Here, "< >" is referred to as a coreference element tag. In addition, "[ ]" is referred to as a link tag, and here, a number enclosed by "[ ]" is referred to as a link ID. A set of noun phrases having the same link ID out of noun phrases represented by the coreference element tags is analyzed as being in a coreference relation.

(9900)
"<Bob>[1] appears. <He>[1] is a student."
(9901)
"Things such as <seafood type>[2], sensibility for grasping <charming sights>[2] is felt."
(9902)
"I interviewed with a <Monaco's diplomatic agent>[3]. <He>[3] seemed busy."

The coreference analyzer performs a learning process by using such training data and acquires such criteria that the same tags can be assigned to texts of the training data as many as possible. In addition, in the determination process, the coreference analyzer assigns tags by applying the criteria acquired through the learning process to an arbitrary text to which tags have not been assigned. As a practical example of the tags, there is method using an extensible markup language (XML).

Incidentally, the coreference element tag represented in the training data designates the range of a noun phrase as a constituent element forming a coreference set, that is, a position (referred to as a front boundary) that is the front side of the range and a position (referred to as a rear boundary) that is the rear side. Such a position is designated, for example in units of morphemes or characters. In the examples of the training data (9900) to (9902) described above, ranges including one morpheme, two morphemes, and four morphemes, respectively, are designated as noun phrases (as antecedents) by front boundaries and rear boundaries are designated. In other words, a result of determining a functional cluster (referred to as a chunk) of a morpheme sequence is represented by the coreference element tag, i.e., a result of determining the range of the morpheme sequence is represented. Generally, a task for determining a chunk of the morpheme sequence as mentioned above is called a chunking task. A task for determining a correspondence relation between noun phrases forming a coreference set is referred to as a coreference task in a narrow sense. When a learning process that is appropriate for such training data is performed, essentially, the coreference task and the chunking task are simultaneously solved (called simultaneous learning).

BRIEF DESCRIPTION OF THE DRAWING

FIG. 13 is a flowchart illustrating the procedure of a process of an antecedent morpheme sequence inferring device and an application validity evaluation determining plugin.

DETAILED DESCRIPTION

Figure 1:
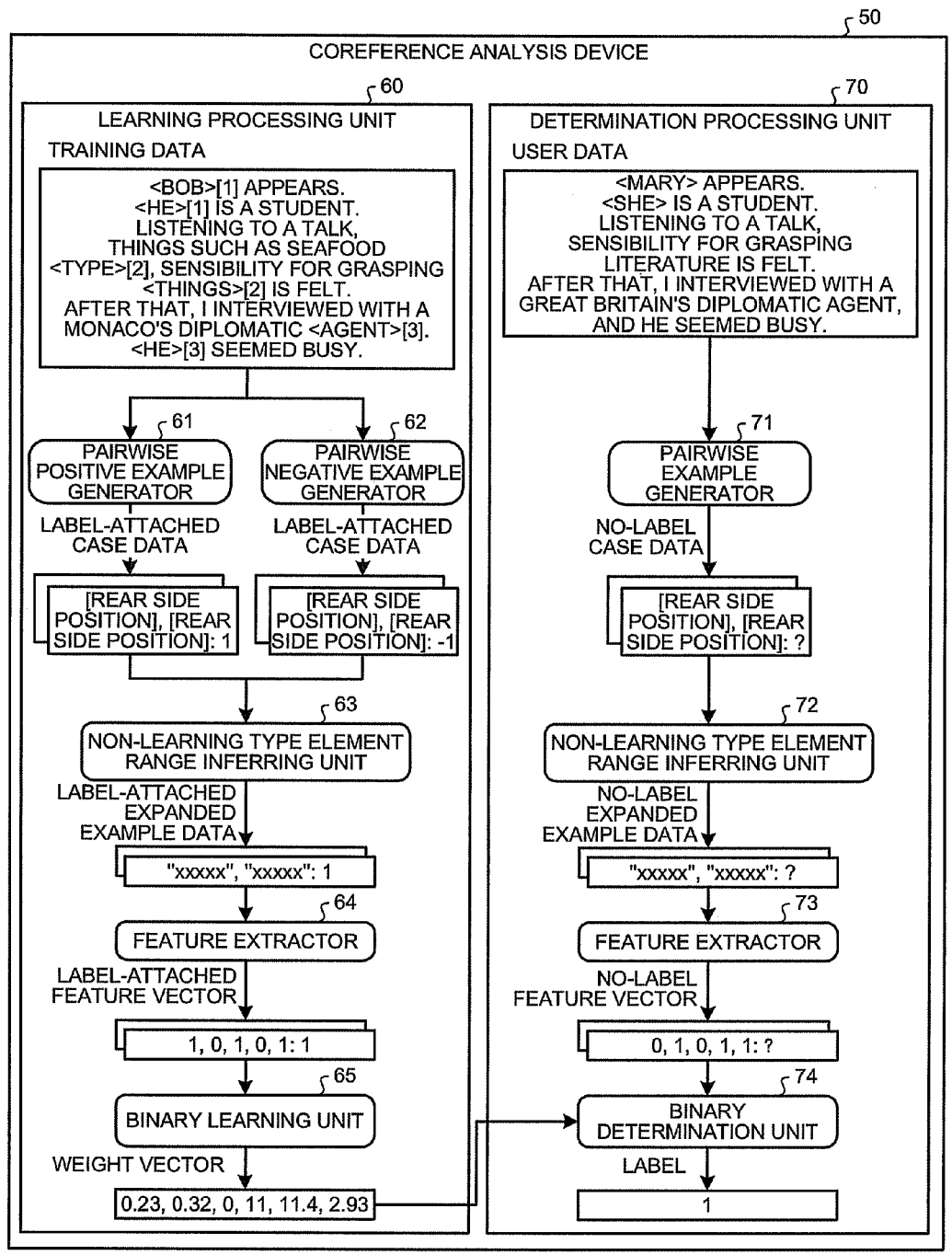
FIG. 1 is a diagram illustrating an example of the functional configuration of a coreference analysis device according to a first embodiment.

In general, according to one embodiment, a learning device includes an input receiving unit, an inferring unit, and a learning unit. The input receiving unit receives an input of first data representing a sentence, rear boundaries of elements having an anaphoric relation within the sentence, and a correspondence relation between a first element that is an antecedent and a second element that is an anaphor. The inferring unit infers a range of the first element and a range of the second element that are determined by front boundaries and the rear boundaries by inferring the front boundaries of the first element and the second element based on the first data and a predetermined rule. The learning unit learns criteria used for determining whether or not there is the anaphoric relation in an arbitrary sentence based on the range of the first element and the range of the second element.

There are two problems in a general coreference analysis device. First, since simultaneously learning is performed, the performance of a coreference task in the narrow meaning is lowered. Because a chunking task itself is difficult, a sufficient performance may not be obtained. Thus, there is a concern that both performances are low. Second, what is required for an application is information of a link that is output by the coreference task in the narrow meaning, and there are many cases where information output by the chunking task is not necessary. Hereinafter, such problems will be described in detail.

Regarding the first problem, the essential difficulty of a learning process (referred to as chunking learning) through the chunking task and a decrease in the performance due to simultaneous learning will be described. The essential difficulty of the chunking learning lies in the fact that the meaning is more important than grammar as a clue. For example, in the training data (9902) described above, although an antecedent is designated as a "Monaco's diplomatic agent," it is also natural to designate the antecedent as a "diplomatic agent." However, in a case where a "Great Britain's diplomatic agent" also appears in a sentence, the "Monaco's diplomatic agent" is more appropriate as the antecedent. Such a determination made in the viewpoint of the meaning is a difficult task for a device. In addition, as will be described later, a determination result that is highly useful as a chunk differs depending on a viewpoint or an application. Generally, since it is also difficult for a human to make such a determination, it is difficult to generate training data, and the quality of the training data may be low. Such training data having low quality may disturb learning.

The reason for the decrease in the performance through simultaneous learning is that it is very difficult to perform the chunking learning described above. In a case where the determination result of the chunking task is sufficiently accurate, the determination result of the chunking task can be used as a determination material of the coreference task in the narrow meaning, and accordingly, the improvement of the performance can be expected. In practical applications, the determination result of the chunking task is inaccurate and may disturb the coreference task in the narrow meaning.

Regarding the second problem, an application example of the coreference analysis will be described based on the following sentence.

(9903)

"A 3D television set Minamishiba XXXXYYYY introduced yesterday at Aosaka Prince Hotel attracted attention of the media. Also to a network bulletin board, a positive opinion that a release of this as early as possible from Minamishiba is expected was posted."

Here, an automatic summarizing application performs a sentence extracting process in which only a main sentence is extracted from given sentences. Since context is lost in the extracted sentence, in a case where a demonstrative pronoun is included in the sentence, the meaning may not be clear. In order to solve the problem, a process of replacing the entity of the demonstrative pronoun with a noun phrase that is specifically represented is performed through a coreference analysis. Here, a process of acquiring the antecedent of an anaphor enclosed by "" of " . . . Also to a network bulletin board, a positive opinion that a release of "this" that is as early as possible from Minamishiba . . . " will be considered.

For example, in an automatic summarizing application that is executed for a search snippet, a screen of a cellular phone, a TV schedule, or the like, the number of characters is limited in many cases. In such a case, an antecedent that includes necessary information as possibly as can is acquired under the limitation of the number of characters. For example, "XXXX-YYYY" in the case of a 10-character limitation, "Minamishiba XXXXYYYY" in the case of a 21-character limitation, or the like is considered as the antecedent to be acquired.

In addition, avoidance of duplication of information may be required depending on an automatic summarizing application. In the case of the sentence (9903) described above, a word "Minamishiba" is already included in the extracted sentence. Accordingly, "3D television set XXXXYYYY" may be more preferable than "3D television set Minamishiba XXXXYYYY" as an antecedent.

As described above, there are many cases where an appropriate chunk is not uniquely determined depending on an application method, context, or the like. Even a person generate training data that represents a correct chunk, there is a high possibility that annotation noise is generated due to divided opinions.

Based on the considerations described above, it cannot be stated that the usefulness of a chunking task for an application is necessarily high, but it can be stated that the chunking task may cause a decrease in the performance of the coreference task. Accordingly, a learning structure used for dissolving only a coreference task in the narrow meaning by avoiding a chunking task is necessary.

In addition, this discussion is also applicable to an anaphor analysis task that analyzes other anaphors such as a zero anaphor or an associative anaphor. The zero anaphor analyzing task that analyzes a zero anaphor is a task for associating an anaphor omitted from a superficial layer of a sentence with an antecedent included in the sentence, and a problem similar to the above-described problem may occur in the designation of the range of the antecedent. The associative anaphor task that analyzes an associative anaphor is a task for associating an anaphor included in a sentence with an antecedent that indirectly relates to the anaphor in the sentence, and a problem similar to the above-described problem may occur in the designation of the range of the antecedent or the anaphor.

The learning device according to an embodiment receives training data that represents a sentence, rear boundaries of elements having an anaphoric relation in the sentence, and a correspondence relation between a first element as an antecedent and a second element as an anaphor and learns criteria used for determining whether there is an anaphoric relation in an arbitrary sentence based on the training data. A determination device receives an input of user data that represents a sentence and rear boundaries of elements that may have an anaphoric relation within the sentence and determines whether there is an anaphoric relation in the sentence using the criteria that has been learned by the learning device based on the user data.

Hereinafter, a learning device, a determination device, a learning method, a determination method, a learning program, and a determination program according to embodiments will be described in detail with reference to the accompanying drawings.

Here, the background and the overview of a coreference analysis according to this embodiment will be described. A coreference element tag of conventional training data represents a start position and an end position of a morpheme sequence as constituent elements that can be a coreference set, i.e., a front boundary and a rear boundary of a constituent element. In addition to this, a link tag used for representing a correspondence relation (link) between constituent elements is represented. Taken together, conventional training data represents three types of information including the front boundary and the rear boundary of each constituent element having a coreference relation and a correspondence relation between a constituent element as an antecedent and a constituent element as an anaphor. In order to set the training data as information avoiding a chunking task, the constituent elements that form a set having a coreference relation may be represented not by a range but by a point.

As one method, there is a method in which any of the front boundary or the rear boundary of a constituent element is eliminated. In the example of the training data (9902) presented in the description of the background, an appropriate antecedent may be "a Monaco's diplomatic agent" or "a diplomatic agent" based on the context. In the example of the training data (9903), an appropriate antecedent may be "3D television set Minamishiba XXXXYYYY," "3D television set XXXXYYYY," "XXXXYYYY," and the like from the view point of an application. As in the above examples, the rear boundary is not changed even based on the context or the application viewpoint. This results from the characteristics of Japanese in which a key term is arranged at the end. On the contrary, in a case where a term arranged at the end is changed such as a case where "a Monaco's diplomatic agent" is changed to "Monaco," the meaning is largely changed in many cases. Thus, in a coreference analysis, it is important to accurately determine the rear boundary.

Accordingly, in this embodiment, a policy is employed in which a learning process and a determining process of front boundaries are not performed for constituent elements that form a coreference set, and only the rear boundary is set as the target for the learning process and the determination process. Therefore, although it is difficult to determine the front boundary, the accuracy rate of the rear boundary can be improved as a tradeoff thereof.

An overview of a coreference analysis method performed in this embodiment based on the above-described policy will be described. Although a front boundary is not given as an input to a learning process, in order to generate a feature vector that is used in the learning process, information is necessary which indicates the range (chunk) of a morpheme as constituent elements forming a coreference set. Thus, in this embodiment, a chunk is preliminarily determined (inferred) by using a method not performed through a learning process, and a learning process and a determination process are performed using a feature vector that is generated based on the chunk. To be more specific, as a method of generating the feature vector, for example, there is a method in which a front boundary is inferred based on a fixed rule, and a feature vector is generated for the range of a morpheme (chunk) that is determined based on the inferred front boundary and a rear boundary. As an example, a rule that "only nouns are included between a rear boundary and a front boundary" is set, and one front boundary is inferred based on the rule. Alternatively, a method may be considered to be used in which a plurality of candidates for a front boundary is inferred based on a plurality of rules, a feature vector is generated for each range (chunk) of a morpheme determined based on the rear boundary and each front boundary, and the feature vector are integrated. Particularly, the latter method can be described as a method taking advantage of a system in which the front boundary may not be uniquely determined. As an example, as a rule that n-gram of words or phrases is formed between a front boundary and a rear boundary, a plurality of rules is set in which the value of n is different from one another, and n front area boundaries are inferred based on each rule. In the case of n-gram of phrases, a subordinate rule such as a rule that a conjunction, an interjection, or the like is not disposed at the front position may be added.

A coreference analysis system that performs a coreference analysis using such a method is largely divided into a learning processing unit and a determination processing unit. Although the learning processing unit and the determination processing unit may be realized by separate information processing devices, here, they are realized by one information processing device. The information processing device is referred to as a coreference analysis device. The learning processing unit of the coreference analysis device performs a learning process in which training data is received as an input, the tendency of the coreference analysis or coreference patterns that frequently appear is learned, and a weight vector is output. The determination processing unit performs a determination process in which it is determined whether or not there is a coreference relation in a sentence (referred to as user data) arbitrarily designated by a user by using the weight vector output by the learning processing unit, and a determination result is output. There are many cases where the learning process is completed before the coreference analysis system is used by a user, and only the determination process is performed when the coreference analysis system is actually used by the user.

In this embodiment, for simplification of description, it is assumed that there is only one pair of constituent elements (two elements forming one set) that form a coreference set, a constituent element appearing on the front side of a sentence is referred to as an antecedent, and a constituent element appearing on the rear side is referred to as an anaphor. In the event of coreference, there is also a case where there is a plurality of antecedents corresponding to one anaphor. In such a case, although the number of constituent elements forming a coreference set is three or more, the configuration of the case can be easily expanded from the configuration of this embodiment, and accordingly, the description of the case will not be presented here.

In this embodiment, in the learning process in which the learning processing unit learns the tendency of the coreference analysis or coreference patterns that frequently appear and outputs a weight vector, a conventional machine learning method is used. In addition, as a task for machine learning, pairwise binary learning is used. The pairwise binary learning uses a method in which an event representing a pair of an antecedent and an anaphor is handled as one example, and it is determined whether or not there is a coreference relation in the example based on a binary value. An event in which there is a coreference relation is referred to as a positive example, and an event in which there is no coreference relation is referred to as a negative example.

Here, the training data that is input to the learning processing unit according to this embodiment will be described. The training data handled in this embodiment represents a sentence tagged with rear boundaries of constituent elements forming a coreference set and link information representing a correspondence relation (link) between the constituent elements forming the coreference set. Here, sentences may be connected as one story as a whole or may be a gathering of a plurality of sentences. In this embodiment, it is assumed that a morpheme analysis is performed first for the training data, and a rear boundary is designated in units of morpheme. The training data is assumed to be represented in the following data format.

(9904)
"<Bob>[1] appears. <He>[1] is a student."
(9905)
"Things such as seafood <type>[2], sensibility for grasping <charming sights>[2] is felt."
(9906)
"I interviewed with a Monaco's diplomatic <agent>[3]. <He>[3] seemed busy."

In this data format, only one morpheme is enclosed by using a tag (coreference element tag) that represents that there are constituent elements forming a coreference set. The coreference element tag is denoted by "< >." This coreference element tag indicates not noun phrases that are constituent elements forming a coreference set but rear boundaries of the constituent elements forming the coreference set. In other words, a position at which the last morpheme out of morphemes included in a noun phrase of the constituent element is present is represented as the rear boundary. In addition, a link tag is attached to each rear boundary. The link tag is a tag in which a number is enclosed by "[ ]." The number enclosed by "[ ]" is a link ID that is used for associating a precedent and an anaphor with each other. By associating the rear boundary of an antecedent and the rear boundary of an anaphor with each other by using the link ID, the link information is represented.

For example, in the training data (9906), as an antecedent, commonly, "diplomatic agent," "Monaco's diplomatic agent," or the like may be considered. In this training data, it is not represented which of the above antecedents is correct, but only the position (rear boundary) at which the last morpheme included in the antecedent is represented as "agent." It should be noted that "agent" is not represented as an antecedent. In this embodiment, the training data, in which the position (front boundary), at which the first morpheme included in an antecedent is present, is not represented, is handled. In addition, as described above, in the training data, the set of an antecedent and an anaphor is one set including two elements. In other words, there is only one antecedent corresponding to one anaphor in the training data.

The training data that is handled in this embodiment, different from the above-described training data (9900) to (9902) presented in the background, is represented in a unique data format in which a sentence, a rear boundary of each constituent element within the sentence, and a correspondence relation between a constituent element as an antecedent and a constituent element as an anaphor are represented. However, the training data may be represented in any data format, as long as rear boundaries and the correspondence relation between an antecedent and an anaphor are represented therein. For example, it may be configured such that training data in which unnecessary information such as front boundaries appears is input, and the unnecessary information is read and discarded by the learning processing unit.

Next, the configuration of a coreference analysis device according to this embodiment will be described in detail. Hereinafter, first, an embodiment will be described in which one fixed rule is used as a rule for inferring a front boundary. Here, the hardware configuration of the coreference analysis device according to this embodiment will be described. The coreference analysis device according to this embodiment includes: a control unit such as a central processing unit (CPU) that controls the overall operation of the device; main memory units such as a read only memory (ROM) and a random access memory (RAM) that store various kinds of data and various programs; auxiliary memory units such as an hard disk drive (HDD) and a compact disc (CD) drive device that store various kinds of data and various programs; and a bus that connects the above-described units. The device has the hardware configuration using a general computer. In addition, in the coreference analysis device, a display unit that displays information, an operation input unit such as a keyboard or a mouse that receives an instruction input from a user, and a communication interface (I/F) that controls the communication of an external device may be connected to the coreference analysis device in a wired or wireless manner.

Next, the functional configuration of the coreference analysis device under such a hardware configuration will be described with reference to FIG. 1. As shown in the figure, a coreference analysis device 50 includes a learning processing unit 60 and a determination processing unit 70. First, the functional configuration of the learning processing unit 60 will be described. The learning processing unit 60 includes: a pairwise positive example generator 61; a pairwise negative example generator 62; a non-learning type element range inferring unit 63; a feature extractor 64; and a binary learning unit 65. Such constituent elements are program modules stored in the main storage unit or the auxiliary storage unit of the coreference analysis device 50, and each function described below is realized by executing each program module by using the CPU included in the coreference analysis device 50.

The pairwise positive example generator 61 receives an input of the above-described training data and performs a pairwise positive example generating process using the training data, thereby acquiring a rear boundary of an antecedent (referred to as an antecedent rear boundary) and a rear boundary of an anaphor (referred to as an anaphor rear boundary) of a positive example. The pairwise positive example generator 61 generates data (referred to label-attached example data) in which the antecedent rear boundary and the anaphor rear boundary are associated with an integer "1." This integer is a reserved value called a label. In a case where the value of the label is "1," it represents that constituent elements represented by the antecedent rear boundary and the anaphor rear boundary forms a positive example. Here, the positive example, as described above, means that a pair of the constituent elements represented by the coreference element tag, which is the source of this example, has a coreference relation and represents a right answer of the coreference relation.

The pairwise negative example generator 62 receives an input of the above-described training data and performs a pairwise negative example generating process using the training data, thereby acquiring an antecedent rear boundary and an anaphor rear boundary of a negative example. The pairwise positive example generator 61 generates label-attached example data in which the antecedent rear boundary and the anaphor rear boundary are associated with a label "−1." In a case where the value of the label is "−1," it represents that constituent elements represented by the antecedent rear boundary and the anaphor rear boundary forms a negative example. Here, the negative example means that there is no coreference relation in the pair of the constituent elements represented by the coreference element tag that is the source of this example.

The non-learning type element range inferring unit 63 receives an input of the label-attached example data generated by the pairwise positive example generator 61 and the label-attached example data generated by the pairwise negative example generator 62. The non-learning type element range inferring unit 63 performs a non-learning type element range inferring process by using such label-attached example data, and thereby inferring a front boundary of the antecedent and a front boundary of the anaphor. Here, a range from the inferred front boundary to the rear boundary for each of the antecedent and the anaphor is referred to as an inferred element range text. The non-learning type element range inferring unit 63 replaces the antecedent rear boundary and the anaphor rear boundary represented by the input label-attached example data with the inferred element range texts and outputs the label-attached example data after the replacement (referred to as label-attached expanded example data).

The feature extractor 64 performs a feature extracting process for generating a feature vector by using the label-attached expanded example data output from the non-learning type element range inferring unit 63. The binary learning unit 65 learns the tendency of the coreference analysis or coreference patterns that frequently appear by using a plurality of the feature vectors generated by the feature extractor 64 and outputs a weight vector acquired as a result of the learning. This weight vector is criteria used by the determination processing unit 70 for determining whether there is a coreference relation in an arbitrary sentence.

Next, the functional configuration of the determination processing unit 70 will be described. The determination processing unit 70 includes: a pairwise example generator 71; a non-learning type element range inferring unit 72; a feature extractor 73; and a binary determination unit 74. Such constituent elements are program modules stored in the main storage unit or the auxiliary storage unit of the coreference analysis device 50, and each function described below is realized by executing each program module by using the CPU included in the coreference analysis device 50.

The pairwise example generator 71 receives an input of a sentence (user data) that is arbitrarily designated by a user and generates example data by performing a pairwise example generating process. The user data represents a sentence and a rear boundary of each constituent element that may have a coreference relation within the sentence. Although the function of the pairwise example generator 71 is approximately similar to the functions of the pairwise positive example generator 61 and the pairwise negative example generator 62 described above, the followings are different from the functions thereof. The training data input to the pairwise positive example generator 61 or the pairwise negative example generator 62 has a data format in which a plurality of coreference relations is assumed to be included and includes the link information. On the other hand, since the user data input to the pairwise example generator 71 has a data format in which candidates for one coreference relation are assumed to be included, it does not include the link information. In addition, the example data, differently from the label-attached example data generated by the above-described pairwise positive example generator 61 performing the pairwise positive example generating process, is not associated with a label representing "1" or "−1." Such example data is referred to as no-label example data.

The non-learning type element range inferring unit 72 receives an input of the no-label example data generated by the pairwise example generator 71 and performs non-learning type element range inferring process by using the no-label example data, thereby inferring a front boundary of the antecedent and a front boundary of the anaphor. Here, a range from the inferred front boundary to the rear boundary for each of the antecedent and the anaphor, as described above, is referred to as an inferred element range text. The non-learning type element range inferring unit 72 replaces the antecedent rear boundary and the anaphor rear boundary represented by the input no-label example data with the inferred element range text and outputs the no-label example data after the replacement (referred to as no-label expanded example data).

The feature extractor 73 performs a feature extracting process for generating a feature vector by using the no-label expanded example data output from the non-learning type element range inferring unit 72. The binary determination unit 74 determines a label by using a plurality of feature vectors generated by the feature extractor 73 and the weight vector output from the above-described learning processing unit 60 and outputs the determined label.

Figure 2:
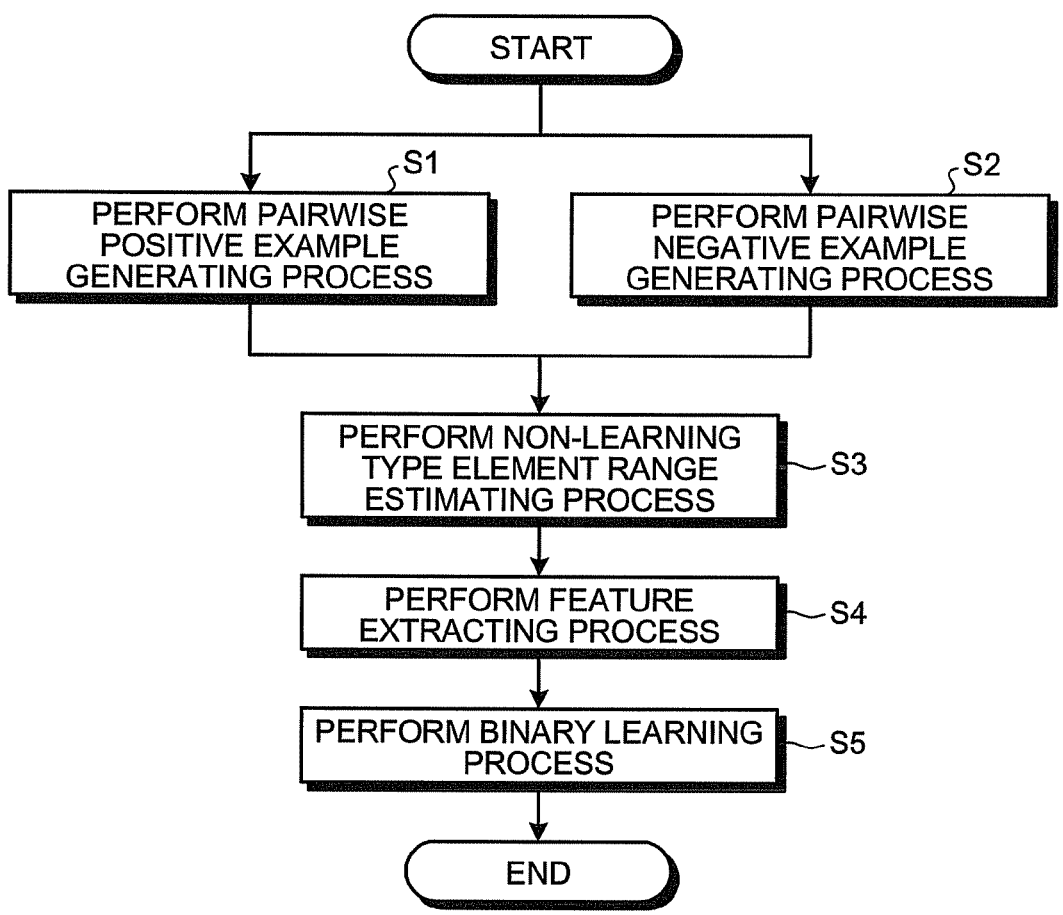
FIG. 2 is a flowchart illustrating the procedure of a learning process.

Next, the procedure of the learning process performed by the learning processing unit 60 of the coreference analysis device 50 will be described with reference to FIG. 2. First, when an input of the above-described training data is received, the pairwise positive example generator 61 of the learning processing unit 60 performs a pairwise positive example generating process in Step S1. The pairwise negative example generator 62 of the learning processing unit 60 performs a pairwise negative example generating process in Step S2.

Figure 3:
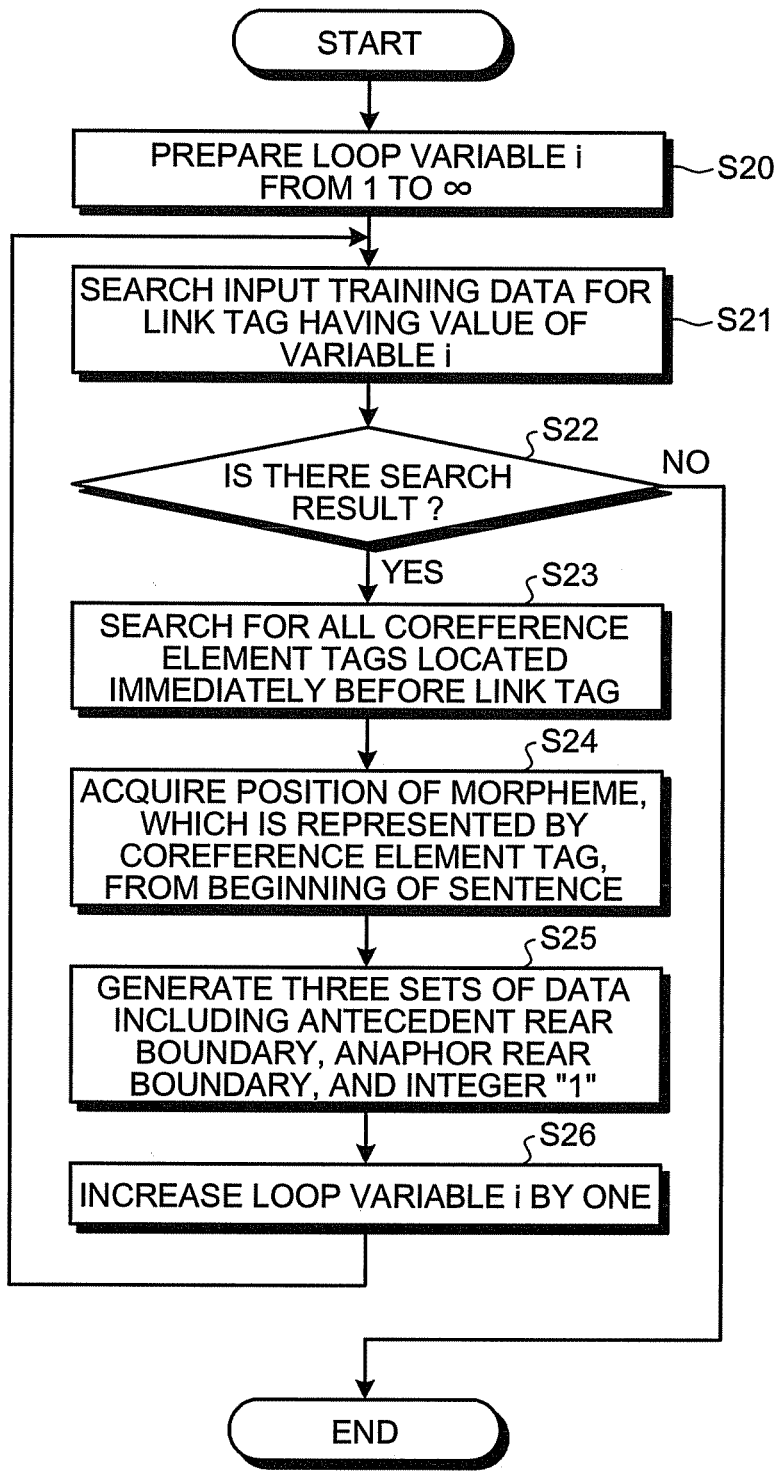
FIG. 3 is a flowchart illustrating the procedure of a pairwise positive example generating process.

Here, the detailed procedure of the pairwise positive example generating process performed by the pairwise positive example generator 61 in Step S1 will be described with reference to FIG. 3. The pairwise positive example generator 61 prepares a loop variable i that is in the range of "1" to "∞" and sets the initial value of the variable i to "1" in Step S20. This loop variable i corresponds to the above-described link ID. Next, the pairwise positive example generator 61 searches for a link tag having the value of the variable i from the input training data in Step S21. In a case where the corresponding link tag cannot be acquired as a result of the search (No in Step S22), the pairwise positive example generator 61 ends the pairwise positive example generating process. On the other hand, in a case where the corresponding link tag is acquired (Yes in Step S22), the pairwise positive example generator 61 searches for all the coreference element tags that are located immediately before the link tag acquired as the result of the search in Step S23. In this embodiment, since only a coreference relation in which there is only one antecedent is handled, as the result of the search, two coreference element tags are necessarily acquired.

Thereafter, the pairwise positive example generator 61 acquires the position of a morpheme, which is represented as a rear boundary by a coreference element tag, from the beginning of the sentence for each coreference element tag acquired as the result of the search performed in Step S23 in Step S24. For example, in a case where a morpheme number used for uniquely identifying morphemes is additionally assigned to each morpheme included in a sentence represented by the training data, the pairwise positive example generator 61 may acquire the morpheme number assigned to the morpheme represented as the rear boundary by the coreference element tag as the position. Alternatively, the pairwise positive example generator 61 may acquire the number of characters from the beginning of the sentence of the morpheme represented as the rear boundary by the coreference element tag as the position. In addition, the position of the antecedent that is acquired based on the coreference element tag is set as the antecedent rear boundary, and the position of the anaphor that is acquired based on the coreference element tag is set as the anaphor rear boundary.

Then, the pairwise positive example generator 61 generates label-attached example data that represents the antecedent rear boundary and the anaphor rear boundary that are acquired in Step S24 with being associated with an integer "1" in Step S25. Thereafter, the pairwise positive example generator 61 increments the loop variable i by one in Step S26 and returns the process to Step S21.

Figure 4:
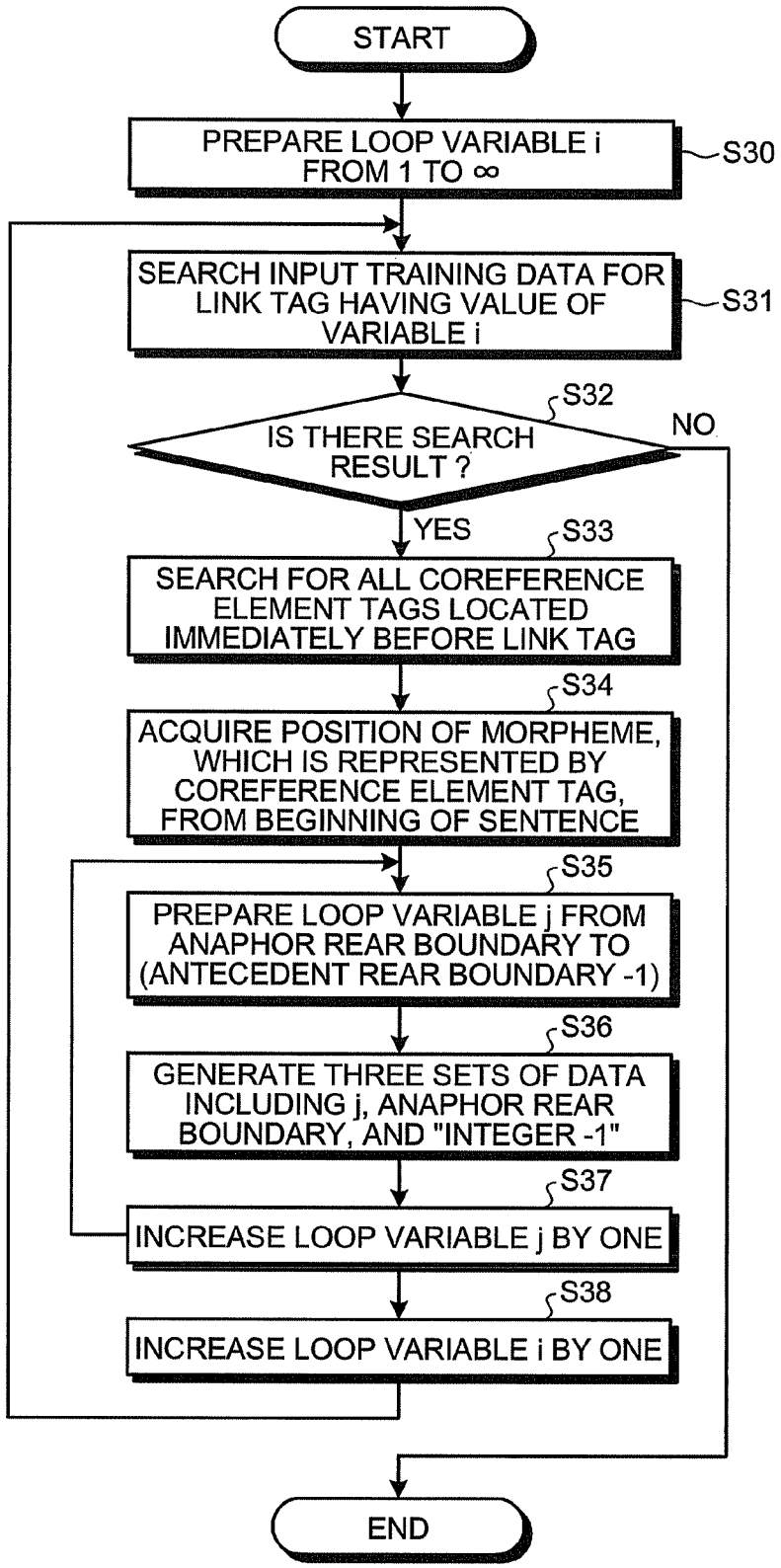
FIG. 4 is a flowchart illustrating the procedure of a pairwise negative example generating process.

Next, the detailed procedure of the pairwise negative example generating process performed by the pairwise negative example generator 62 in Step S2 will be described with reference to FIG. 4. Steps S30 to S34 are similar to Steps S20 to S24 described with reference to FIG. 3, and accordingly, the description thereof will not be presented. After Step S34, the pairwise negative example generator 62 prepares a loop variable j from the anaphor rear boundary acquired in Step S34 to "the antecedent rear boundary −1" in Step S35. Thereafter, the pairwise negative example generator 62 generates label-attached example data in which the loop variable j is represented and the anaphor rear boundary is represented with being associated with an integer "−1" in Step S36. Here, the loop variable j is set as the antecedent rear boundary spuriously. Thereafter, the pairwise negative example generator 62 increments the loop variable j by one in Step S37, and the process proceeds to Step S35. Then, the pairwise negative example generator 62 increments the loop variable i by one in Step S38 and, the process proceeds to Step S31.

Simply put, the pairwise negative example generating process is a process in which a set out of sets of arbitrary morphemes present between constituent elements forming a coreference set of a positive example, in which only an anaphor coincides, is regarded as a negative example. As a general procedure of generating training data that is performed by a person, there is a procedure in which, first, an anaphor is searched, and an antecedent is searched by tracking morphemes back to the front side of the sentence from the anaphor. It is understood that at least a morpheme not regarded as an antecedent in the procedure of tracking the morphemes back to the front side of the sentence is assured not to be in a coreference relation with the anaphor. The description presented above is the reason for regarding a set of constituent elements handled in the pairwise negative example generating process as a negative example.

Figure 5:
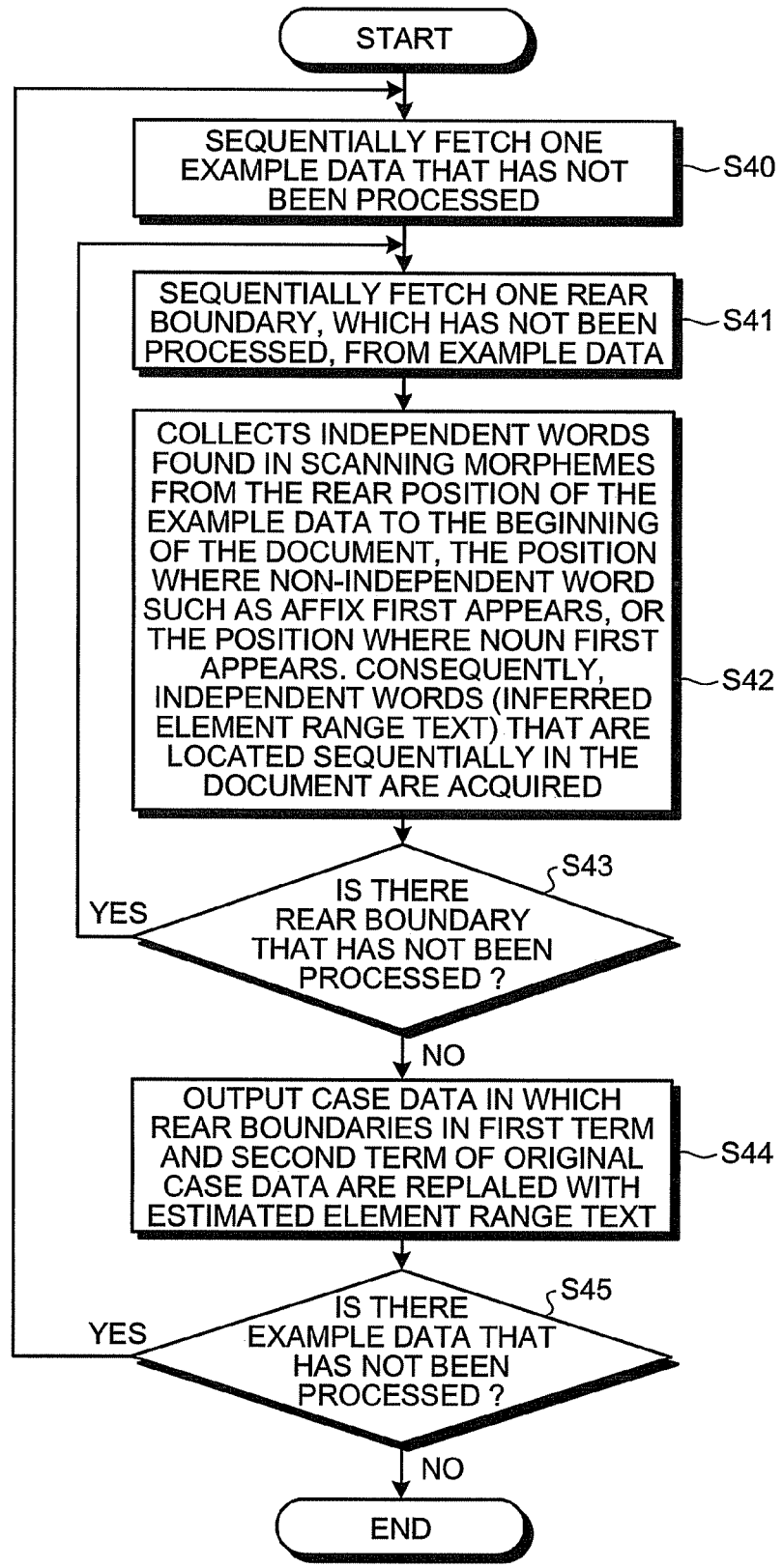
FIG. 5 is a flowchart illustrating the procedure of a non-learning type element range inferring process.

The description will be presented with reference back to FIG. 2. The non-learning type element range inferring unit 63 of the learning processing unit 60 performs a non-learning type element range inferring process in Step S3 by using the label-attached example data generated in Step S1 and the label-attached example data generated in Step S2. Here, the procedure of the non-learning type element range inferring process that is performed by the non-learning type element range inferring unit 63 in Step S3 will be described with reference to FIG. 5. In Step S40, the non-learning type element range inferring unit 63 sequentially fetches one, which has not been processed, of the label-attached example data generated in Step S1 and the label-attached example data generated in Step S2. Thereafter, the non-learning type element range inferring unit 63 infers a front boundary of an antecedent and a front boundary of an anaphor based on a predetermined rule. For example, the non-learning type element range inferring unit 63 sequentially fetches one rear side position, which has not been processed, out of the antecedent rear boundary and the anaphor rear boundary represented in the label-attached example data fetched in Step S40 in Step S41. Then, the non-learning type element range inferring unit 63 collects independent words found in scanning morphemes from the rear position of the example data to the beginning of the document, the position where non-independent word such as affix first appears, or the position where noun first appears. Consequently, independent words (inferred element range text) that are located sequentially in the document are acquired. Then, the non-learning type element range inferring unit 63 outputs a morpheme sequence that is present in the range from a non-independent word acquired as a search result or an independent word immediately after the beginning of the sentence to the morpheme represented by the rear side position in Step S42. Such a morpheme sequence is assumed to be the inferred element range text. For example, in a sentence "I interviewed with a Monaco's diplomatic agent," in a case where the rear position is "agent," "'s" that is disposed on the front side thereof is a non-independent word. Accordingly, an inferred element range text, the morpheme sequence, ranging from "diplomatic" which is an independent word existing right after the non-independent word to "agent" existing at the very rear position thereof is "diplomatic agent." In other words, in this example, a morpheme "diplomatic" is inferred as the front boundary. A technique of inferring a front boundary of an antecedent and a front boundary of an anaphor based on a fixed rule given by orders from above as the predetermined rule is called a non-learning type.

Then, in a case where there is a rear side position that has not been processed (Yes in Step S43), the process is returned to Step S41, and, in a case where there is no rear side position that has not been processed (No in Step S43), the process proceeds to Step S44. In Step S44, the non-learning type element range inferring unit 63 respectively replaces the antecedent rear boundary and the anaphor rear boundary represented in the label-attached example data fetched in Step S41 with the inferred element range text output in Step S42. The non-learning type element range inferring unit 63 outputs the label-attached example data after the replacement (referred to as label-attached expanded example data). Then, in a case where there is label-attached example data that has not been processed (Yes in Step S45), the process is returned to Step S40, and, in a case where there is no label-attached example data that has not been processed (No in Step S45), the non-learning type element range inferring unit 63 ends the non-learning type element range inferring process.

The description will be presented with reference back to FIG. 2. In Step S4, the feature extractor 64 of the learning processing unit 60 performs a feature extracting process for generating a feature vector by using the label-attached expanded example data output in Step S3. Since the feature extracting process can be performed by using a conventional method, here, an overview thereof will be described. In addition, although there are various methods for generating a feature vector, here, a method of generating a binary feature vector will be described. The binary feature vector is a vector that includes elements of which the number corresponds to the number of dimensions and represents the presence/non-presence of each feature according to each element by "1" or "0" (referred to as an element value). Although there are various features according to each element depending on the coreference analysis method, when the features are largely divided into categories, there are a semantic feature, a superficial feature, and a structural feature. In addition, each feature can be divided into two types of pointwise feature and pairwise feature. Generally, when the numbers of dimensions (the number of elements within a vector) generated based on such features are summed, it reaches several thousands to several tens of thousands.

As one example of the pointwise superficial feature, there is "Is "Minamishiba" included in the first inferred element range text." In a case where the determination result is positive, "1" is the element value, and, in a case where the determination result is negative, "0" is the element value. Apparently, the "Minamishiba" portion can be replaced with the entire words represented in the Japanese. Accordingly, in a case where the coreference analysis device 50 is configured so as to use the entire words represented in Japanese as features, the number of dimensions is the number of the types of the entire words in Japanese based on only the superficial feature of this format. As mentioned above, as the pointwise feature, a feature of each text is acquired.

As another example of the pairwise superficial feature, there is "Do the first inferred element range text and the second inferred element range text coincide with each other in one character." In a case where the determination result is positive, "1" is the element value, and, in a case where the determination result is negative, "0" is the element value. Apparently, the portion of "one character" can be replaced with an arbitrary number of characters such as two characters or three characters. As mentioned above, as the pairwise feature, a feature of a relation between two texts is acquired.

Also for the semantic feature and the structural feature, the element value of the feature vector can be determined through a procedure that is similar to the above-described procedure. For the label-attached expanded example data output in Step S3, the feature extractor 64 outputs a label-attached feature vector acquired by combining the feature vector generated and the label represented by the label-attached expanded example data. In addition, in a case where there is a plurality of pairs of constituent elements having coreference relations in the training data, a plurality of label-attached expanded example data is output in Step S3, and a plurality of label-attached feature vectors is output by using each label-attached expanded example data in Step S4.

Next, the binary learning unit 65 of the learning processing unit 60 learns the tendency of the coreference analysis or coreference patterns that frequently appear by using a label-attached feature vector group including the plurality of label-attached feature vectors output in Step S4. The learning processing unit 60 outputs a weight vector that is acquired as a result of the learning in Step S5. Since this learning can be performed by using a conventional machine learning method, an overview thereof will be described here. The function of the binary learning unit 65 corresponds to a learning process performed for the purpose of a teacher's identification task in a general machine learning framework. As machine learning techniques that are frequently used in the teacher's identification task, there are techniques such as a neural network, support vector machine (SVM), and logistic regression and boosting. In a case where any of the techniques is used, a label-attached feature vector group is input, and a weight vector is output. Each element of the weight vector is associated with each element of the feature vector, and a greater element value of the weight vector means a stronger influence of the element value of the feature corresponding thereto on an identification result. Here, a mathematical model and a method of deriving a solution in each machine learning process will not be described.

Figure 6:
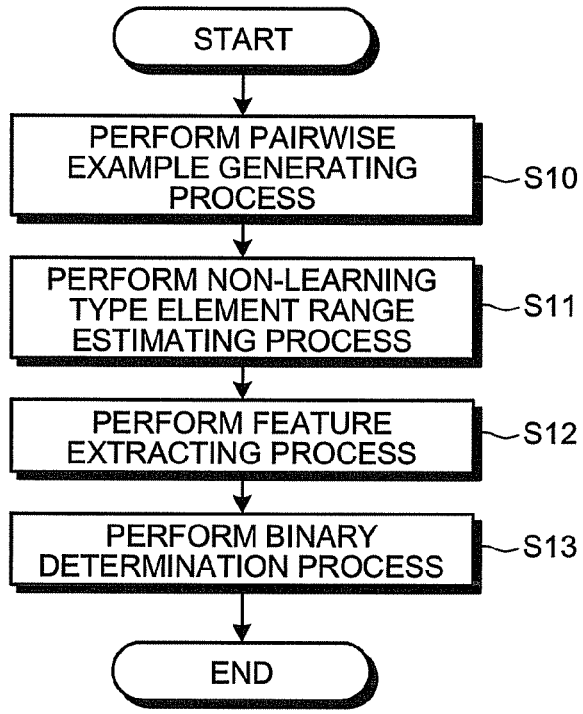
FIG. 6 is a flowchart illustrating the procedure of an inferring process.

Next, the procedure of the determination process performed by the determination processing unit 70 will be described with reference to FIG. 6. First, when an input of a sentence (user data) that is arbitrarily designated by a user is received, for example, through the operation input unit, the pairwise example generator 71 of the determination processing unit 70 performs a pairwise example generating process in Step S10. Although the pairwise example generating process is approximately similar to the pairwise positive example generating process of Step S1 illustrated in FIG. 2, the followings are different from the pairwise positive example generating process. Since the user data input to the pairwise example generator 71 does not include the link information, the pairwise example generator 71, differently from the pairwise positive example generator 61, does not need to perform a process relating to the link information, that is, a process of searching for a link tag using a loop variable. In addition, the pairwise example generator 71, differently from the label-attached example data that is generated by the pairwise positive example generator 61 through the pairwise positive example generating process, does not associate a label representing "1" or "−1" in the example data generating process.

Figure 7:
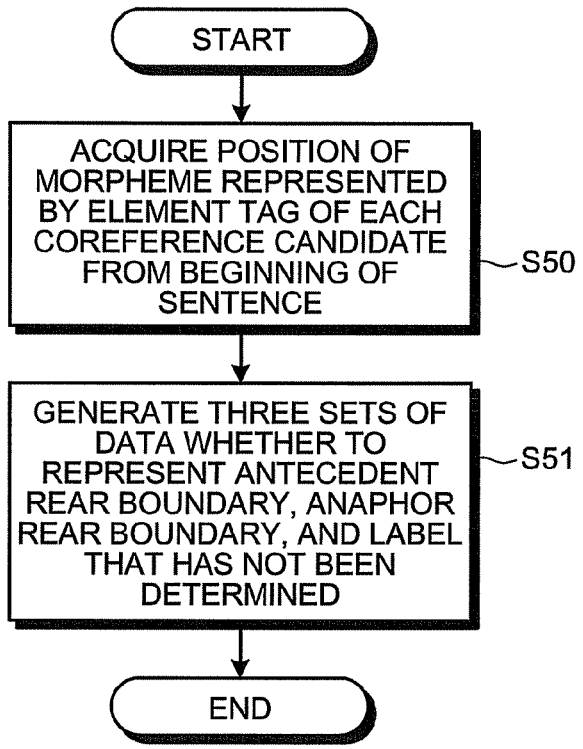
FIG. 7 is a flowchart illustrating the procedure of a pairwise example generating process.

Here, the procedure of the pairwise example generating process that is performed by the pairwise example generator 71 in Step S10 will be described with reference to FIG. 7. The pairwise example generator 71 searches the input user data for a coreference element tag that is used for designating constituent elements that are candidates for a coreference set. For each coreference element tag acquired as a result of the search, the pairwise example generator 71, similarly to Step S24 illustrated in FIG. 3, acquires the position of a morpheme represented by the coreference element tag as the rear boundary from the beginning of a sentence in Step S50. As described above, the position acquired based on the coreference element tag of the antecedent is set as the antecedent rear boundary, and the position of the anaphor acquired based on the coreference element tag is set as the anaphor rear boundary. The pairwise example generator 71 generates example data (no-label example data) that represents the antecedent rear boundary and the anaphor rear boundary acquired in Step S50 with being associated with an undetermined label in Step S51. In the example illustrated in FIG. 1, an undetermined label is denoted by "?".

The description will be presented with reference back to FIG. 6. In Step S11, the non-learning type element range inferring unit 72 of the determination processing unit 70 performs a non-learning type element range inferring process by using the no-label example data generated in Step S10. Here, since the procedure of the non-learning type element range inferring process that is performed by the non-learning type element range inferring unit 72 in Step S11 is approximately similar to that described with reference to FIG. 5, the description thereof will not presented. However, the no-label example data is fetched in Step S40. Accordingly, in Step S44, the non-learning type element range inferring unit 72 replaces the antecedent rear boundary and the anaphor rear boundary that are represented by the no-label example data fetched in Step S41 with the inferred element range text output in Step S42. The non-learning type element range inferring unit 72 outputs the no-label example data after the replacement (referred to as no-label expanded example data).

The description will be presented with reference back to FIG. 6. In Step S12, the feature extractor 73 of the determination processing unit 70 performs a feature extracting process for generating a feature vector by using the no-label expanded example data output in Step S11. Since this feature extracting process is similar to the process performed in Step S4 illustrated in FIG. 2 described above, the description thereof will not be presented. However, here, for the no-label expanded example data output in Step S11, the feature extractor 73 outputs a no-label feature vector that is acquired by combining the generated feature vector and an indication representing that the label is undetermined.

Next, the binary determination unit 74 of the determination processing unit 70 determines a label by using the no-label feature vector group including the no-label feature vectors output in Step S12 and the weight vector output by the above-described learning process described with reference to FIG. 2. The binary determination unit 74 outputs the determined label in Step S13. Since this determination can be made by using a conventional machine learning method, an overview thereof will be described here. The function of the binary determination unit 74 corresponds to a determination process performed for the purpose of a teacher's identification task in a general machine learning framework. As machine learning techniques that are frequently used in the teacher's identification task, there are techniques such as a neural network, a support vector machine (SVM), and logistic regression and boosting. In a case where any of the techniques is used, a no-label feature vector group is input, and a label as a determination result is output. In this embodiment, an example where the value of the label is "1" is a positive example, in other words, means that the example data is in a coreference relation, and an example where the value of the label is "−1" is a negative example, in other words, means that the example data is not in a coreference relation.

According to this embodiment, the learning processing unit 60 performs the learning process using the rear boundaries of an antecedent and an anaphor that have a coreference relation without using the front boundaries thereof. Accordingly, the accuracy of the determination of the antecedent and the anaphor having a coreference relation, which is made by the determination processing unit 70 for the user data, can be improved.

For example, in the pairwise binary learning, when a learning process is performed by using conventional training data, an example where "Monaco's diplomatic agent" is set as an antecedent and an example where "diplomatic agent" is set as an antecedent for the training data (9902) described in the background are differently determined as a positive example and a negative example. However, in a learning process through machine learning, since the reason why the latter example is determined as the negative example cannot be determined as being on the front boundary or the rear boundary, a problem of adding a penalty to both sides may occur. However, according to this embodiment, both an example where "Monaco's diplomatic agent" is set as an antecedent and an example where "diplomatic agent" is set as an antecedent are determined as positive examples, which are not different from each other, and accordingly, the rear boundary "agent" is recognized as a correct selection for determining the antecedent. In other words, according to this embodiment, the accuracy in the determination of the rear boundary can be improved, and consequently, the accuracy in the determination of an antecedent and an anaphor having a coreference relation can be improved.

Next, a learning device, a determination device, a learning method, a determination method, a learning program, and a determination program according to a second embodiment will be described. To a portion common to the first embodiment described above, the same reference numeral will be assigned for description, or the description thereof will not be presented.

In order to generate a feature vector used for a learning process or a determination process, a chunk needs to be preliminarily determined (inferred) by using a method not performed through a learning process. In the first embodiment described above, each of the learning processing unit 60 and the determination processing unit 70 infers one front boundary based on the rear boundary given through the non-learning type element range inferring process by following a fixed rule, outputs a morpheme sequence (chunk) that is present in the range from the front boundary to the rear boundary as an inferred element range text, and generates a feature vector by using the inferred element range text. In this embodiment, each of the learning processing unit 60 and the determination processing unit 70 infers a plurality of candidates for the front boundary based on a plurality of rules, generates a feature vector for each morpheme sequence that is present in each range from a front boundary to a rear boundary, and integrates the generated feature vectors.

Figure 8:
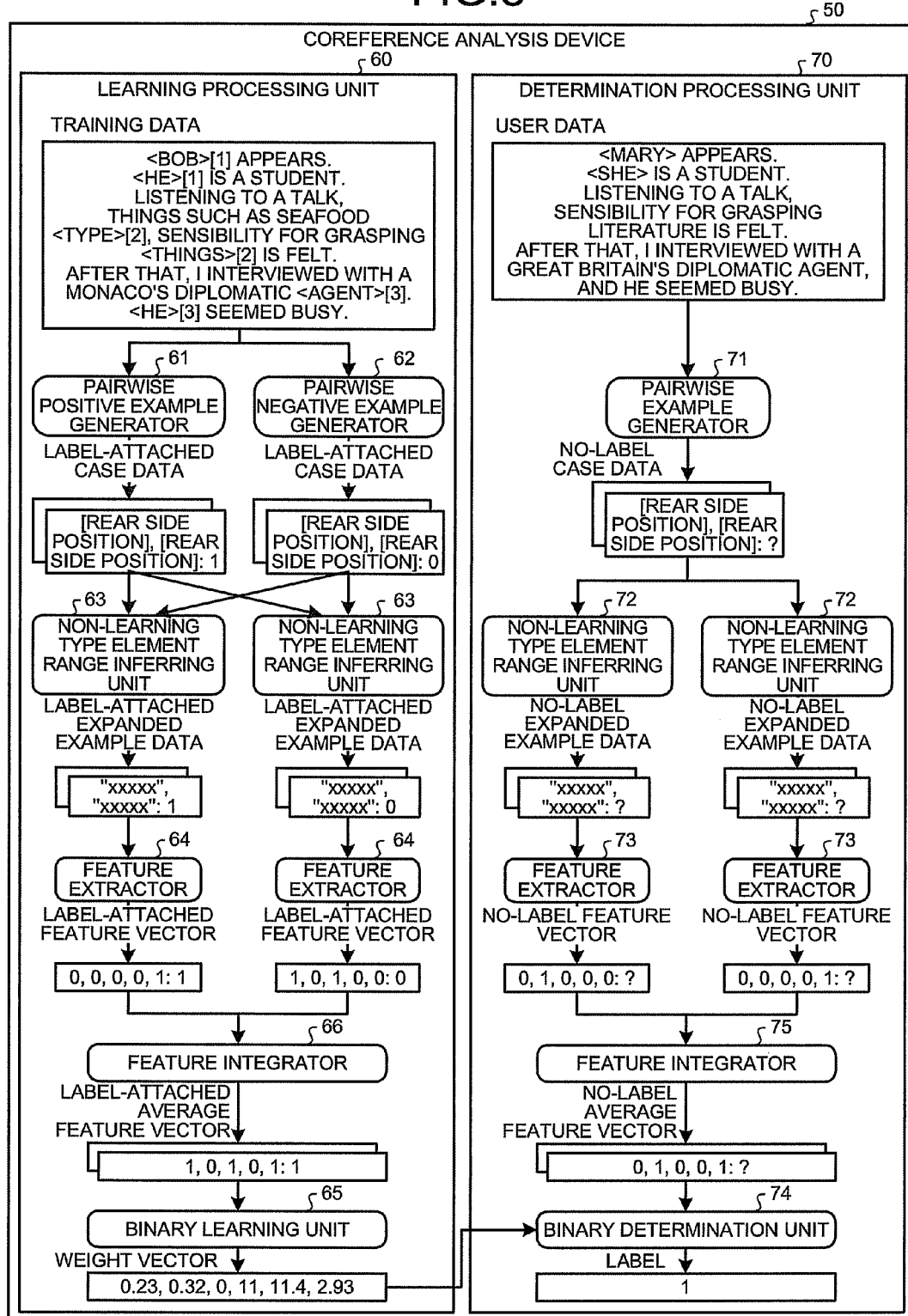
FIG. 8 is a diagram illustrating an example of the functional configuration of a coreference analysis device according to a second embodiment.

FIG. 8 is a diagram illustrating an example of the functional configuration of a coreference analysis device 50 according to this embodiment. As illustrated in the figure, the learning processing unit 60 further includes a feature integrator 66 in addition to the pairwise positive example generator 61, the pairwise negative example generator 62, the non-learning type element range inferring units 63, the feature extractors 64, and the binary learning unit 65. The feature integrator 66 is a program module that is stored in a main storage unit or an auxiliary storage unit of the coreference analysis device 50, and a function described below is realized by executing the program module by using the CPU included in the coreference analysis device 50. In addition, the learning processing unit 60 includes a plurality of the non-learning type element range inferring unit 63 and a plurality of the feature extractors 64. In the example illustrated in the figure, although there are two non-learning type element range inferring units 63 and two feature extractors 64, this embodiment is not limited thereto.

The functions of the pairwise positive example generator 61 and the pairwise negative example generator 62 are similar to those of the first embodiment. Each of the plurality of the non-learning type element range inferring units 63 receives an input of the label-attached example data generated by the pairwise positive example generator 61 and the label-attached example data generated by the pairwise negative example generator 62. Each of the plurality of the non-learning type element range inferring units 63 performs a non-learning type element range inferring process using the label-attached example data, similarly to the first embodiment, and outputs the label-attached expanded example data.

The plurality of the feature extractors 64 has a one-to-one correspondence relation with the plurality of the non-learning type element range inferring units 63. Each feature extractor 64, similarly to that of the first embodiment, performs a feature extracting process for generating a label-attached feature vector by using the label-attached expanded example data output by the corresponding non-learning type element range inferring unit 63. The feature integrator 66 integrates the label-attached feature vectors generated by the plurality of the feature extractors 64. As an integration method, for example, in a case where the element value of each label-attached feature vector is a binary value, a method in which a logical sum (or) of element values of the elements is taken, in a case where each element value is a real number, a method in which an average of the element values of the elements is taken, or the like may be considered. As a result of the integration process, a label-attached feature vector is acquired and is represented in a data format that is similar to that of the first embodiment.

The binary learning unit 65 learns the tendency of the coreference analysis or coreference patterns that frequently appear by using the label-attached feature vector acquired through the integration process of the feature integrator 66 and outputs a weight vector acquired as a result of the learning process.

The determination processing unit 70 further includes a feature integrator 75, in addition to the pairwise example generator 71, the non-learning type element range inferring units 72, the feature extractors 73, and the binary determination unit 74. The feature integrator 75 is a program module stored in a main storage unit or an auxiliary storage unit of the coreference analysis device 50, and a function described below is realized by executing the program module by using the CPU included in the coreference analysis device 50. In addition, the determination processing unit 70 includes a plurality of the non-learning type element range inferring units 72 and a plurality of the feature extractors 73. In the example illustrated in the figure, although there are two non-learning type element range inferring units 72 and two feature extractors 73, this embodiment is not limited thereto.

The function of the pairwise example generator 71 is the same as that of the first embodiment. Each of the plurality of the non-learning type element range inferring units 72 receives an input of the no-label example data generated by the pairwise example generator 71. Each of the plurality of the non-learning type element range inferring units 72, similarly to that of the first embodiment, performs the non-learning type element range inferring process by using the no-label example data and outputs no-label expanded example data.

The plurality of the feature extractors 73 has a one-to-one correspondence relation with the plurality of the non-learning type element range inferring units 72. Each feature extractor 73, similarly to that of the first embodiment, performs a feature extracting process for generating a no-label feature vector by using the no-label expanded example data output by the corresponding non-learning type element range inferring unit 72. The feature integrator 75 integrates the no-label feature vectors generated by the plurality of the feature extractors 73. The integration method is similar to that performed by the feature integrator 66 of the learning processing unit 60. As a result of the integration process, a no-label feature vector is acquired and is represented in a data format that is similar to that of the first embodiment.

The binary determination unit 74, by using the no-label feature vectors integrated by the feature integrator 75, determines a label by using the weight vector output by the above-described learning processing unit 60 and outputs the determined label.

Figure 9:
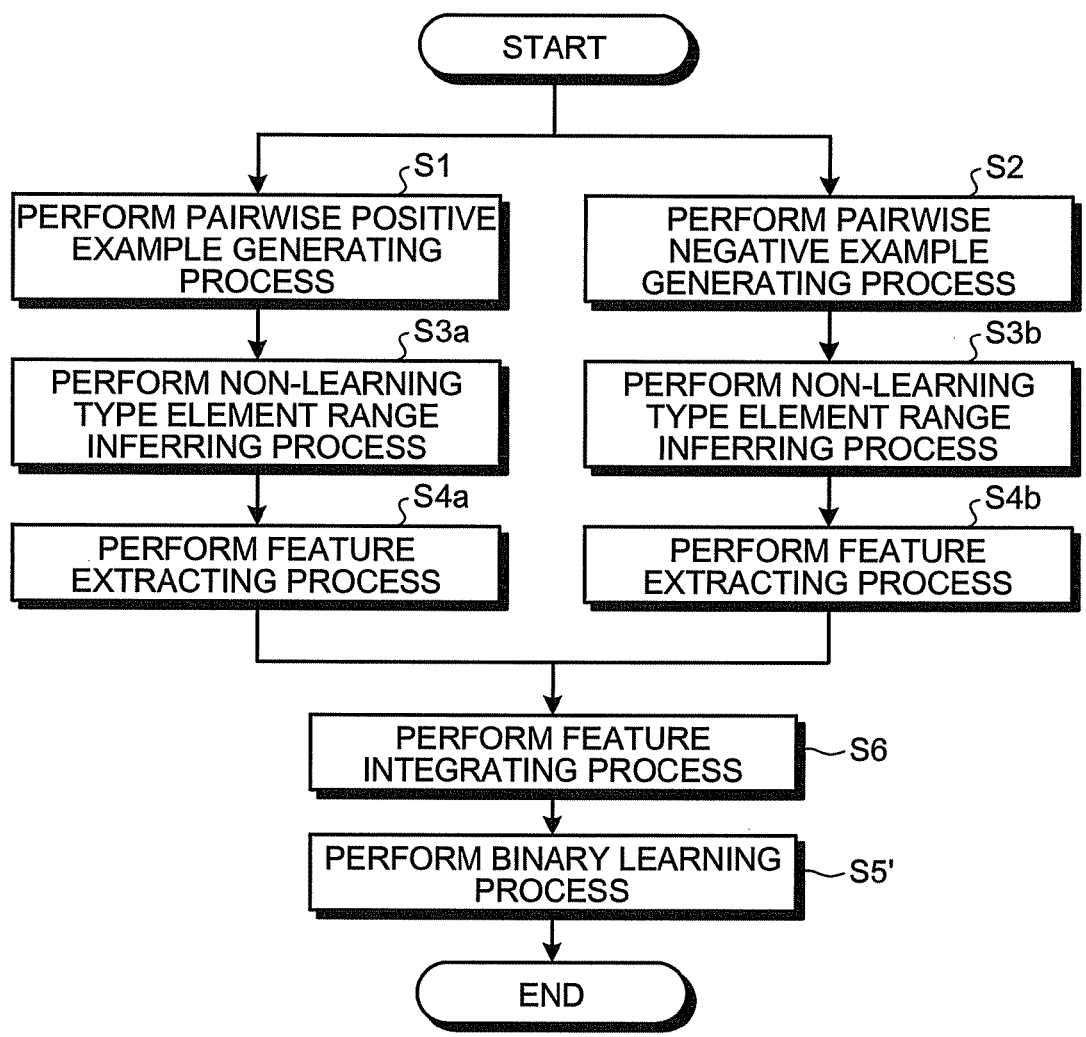
FIG. 9 is a flowchart illustrating the procedure of a learning process.

Next, the procedure of a learning process performed by the learning processing unit 60 included in the coreference analysis device 50 will be described with reference to FIG. 9. Steps S1 and S2 are similar to those of the first embodiment. After Steps S1 and S2, each of the plurality of the non-learning type element range inferring units 63 of the learning processing unit 60 performs a non-learning type element range inferring process by using the label-attached example data generated in Step S1 and the label-attached example data generated in Step S2, in Steps S3a to S3b. The method of the non-learning type element range inferring process is similar to that of the first embodiment. However, the predetermined rules used for inferring the front boundaries of the antecedent and the anaphor by the plurality of the non-learning type element range inferring units 63 are different for the plurality of the non-learning type element range inferring units 63. Thereafter, in Steps S4a to S4b, each of the plurality of the feature extractors 64 of the learning processing unit 60 performs a feature extracting process for generating a feature vector by using the label-attached expanded example data output in Steps S3a and S3b. This feature extracting process is similar to that of the first embodiment. Thereafter, in Step S6, the feature integrator 66 of the learning processing unit 60 integrates the plurality of the label-attached feature vectors output in Steps S4a and S4b. As a result of the integration process, a label-attached feature vector represented in a data format that is similar to that of the label-attached feature vectors output in Steps S4a and S4b can be acquired.

Then, the binary learning unit 65 of the learning processing unit 60 learns a weight vector by using a label-attached feature vector group including the label-attached feature vector acquired through the integration process of Step S6 and outputs the weight vector acquired as a result of the learning process in Step S5'. The method of learning the weight vector is similar to that of the first embodiment.

Figure 10:
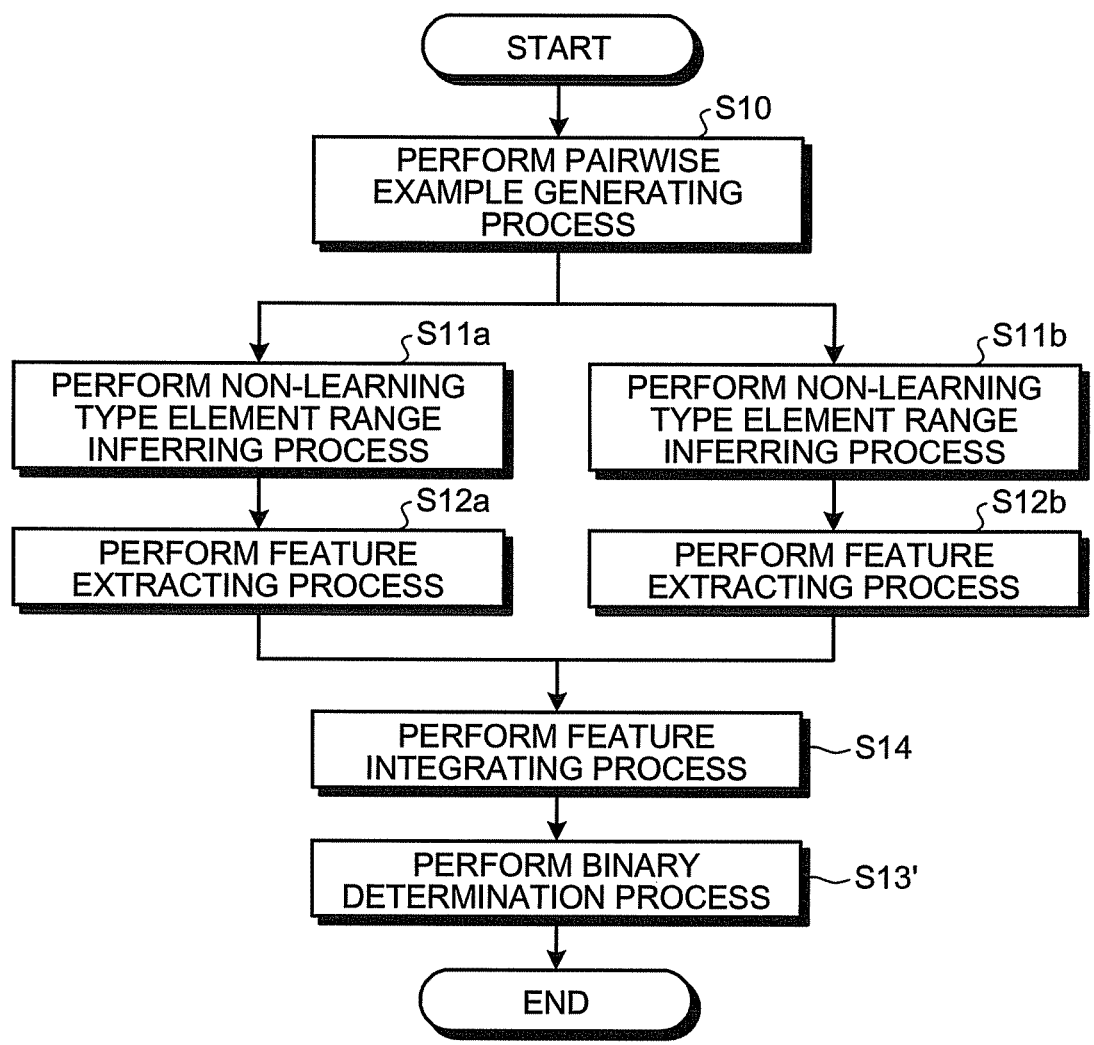
FIG. 10 is a flowchart illustrating the procedure of a determination process.

Next, the procedure of the determination process performed by the determination processing unit 70 will be described with reference to FIG. 10. Step S10 is the same as that of the first embodiment. Thereafter, in Steps S11a and S11b, each of the plurality of non-learning type element range inferring units 72 of the determination processing unit 70 performs a non-learning type element range inferring process by using the example data generated in Step S10. The method used in the non-learning type element range inferring process is similar to that of the first embodiment. However, the predetermined rules used when the front boundaries of antecedents and anaphor are inferred by the plurality of non-learning type element range inferring units 72 are different for each of the plurality of non-learning type element range inferring units 72. Thereafter, in Steps S12a and S12b, each of the plurality of feature extractors 73 of the determination processing unit 70 performs a feature extracting process for generating a feature vector by using the no-label expanded example data output in Steps S11a and S11b. This feature extracting process is similar to that of the first embodiment. Thereafter, in Step S14, the feature integrator 75 of the determination processing unit 70 integrates the plurality of no-label feature vectors output in Steps S12a and S12b. As a result of the integration process, a no-label feature vector represented in a data format similar to that of the no-label feature vectors output in Steps S12a and S12b can be acquired.

Then, the binary determination unit 74 of the determination processing unit 70, by using a no-label feature vector group including the no-label feature vectors acquired in Step S14, determines a label by using the weight vector output by the learning process described above with reference to FIG. 9. The determination processing unit 70 outputs the determined label in Step S13'. The determination method is similar to that of the first embodiment.

According to this embodiment, the learning processing unit 60 performs the learning process by using the rear boundaries without using the front boundaries of an antecedent and an anaphor having a coreference relation. Accordingly, the accuracy in the determination of the rear boundaries of an antecedent and an anaphor having a coreference relation for the user data by using the determination processing unit 70 can be improved.

Furthermore, a more flexible coreference analysis system can be provided by inferring a plurality of candidates for the front boundary based on a plurality of rules and integrating the feature vectors generated for each morpheme sequence determined by the rear boundary and each front boundary.

Next, a learning device, a determination device, a learning method, a determination method, a learning program, and a determination program according to a third embodiment will be described. To a portion common to the first embodiment or the second embodiment described above, the same reference numeral will be assigned for description, or the description thereof will not be presented.

In this embodiment, an example will be described in which the function of the determination processing unit 70 described in the first embodiment or the second embodiment is applied to an application. Such an application can acquire only the rear boundary of an antecedent corresponding to an anaphor. For example, the application searches for an antecedent corresponding to a noun phrase for the noun phrase that is present in a sentence (text) as a processing target. In the above-described background, an application has been described in which an automatic summarizing application searches for a noun directed by a demonstrative pronoun (for example, "this" or the like) included in the sentence as the processing target. In this embodiment, the functional configuration that is necessary for realizing such an application will be described. Here, an overview of the functional configuration will be described. When a sentence as a processing target and the rear boundaries of anaphors are input, the application sequentially selects a candidate for the rear boundary of an antecedent from the vicinity of the anaphor and determines whether or not there is an anaphoric relation by using the rear boundary of the anaphor and candidate for the rear boundary of the antecedent. In a case where a result indicating that there is no coreference relation is acquired, the application selects a candidate for the rear boundary in the order toward the front side of the sentence until a result indicating that there is the coreference relation is acquired. The rear boundary for which the result indicating that there is a coreference relation is acquired represents the rear boundary of the antecedent. On the other hand, in a case where a result indicating that there is a coreference relation cannot be acquired even when this process is performed up to the beginning of the sentence, a result indicating that no antecedent is present is acquired. The result acquired at this time is only the rear boundary of the antecedent. In a case where a morpheme sequence of the antecedent is desired to be acquired, the application searches for the front boundary of the antecedent from the rear boundary toward the front side in the sentence. The application determines whether or not the range of the antecedent determined by the front boundary and the rear boundary coincides with the purpose of the application (application purpose) and acquires a desired morpheme sequence (chunk) based on the determination result.

Figure 11:
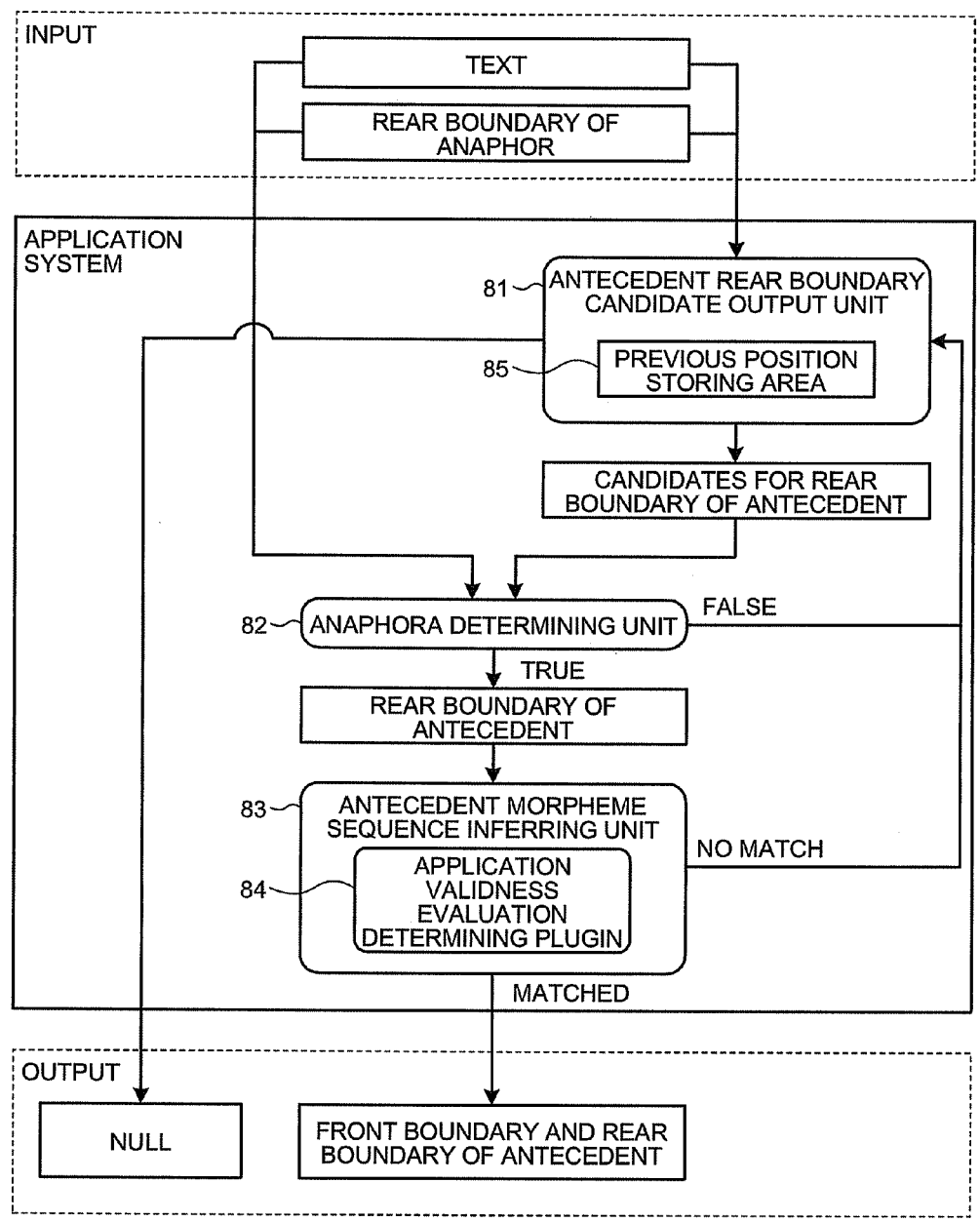
FIG. 11 is a diagram illustrating an example of the functional configuration of an application system according to a third embodiment.

Next, the detailed functional configuration of an application system in which an application is embedded will be described as well with reference to FIG. 11. The application system includes an antecedent rear boundary candidate output unit 81, an anaphora determining unit 82, and an antecedent morpheme sequence inferring unit 83. As illustrated in the figure, a text and the rear boundary of an anaphor are input to the application system, and the front boundary and the rear boundary of an antecedent are output from the application system in a case where the antecedent is found. In the case of the above-described automatic summarizing application, the input corresponds to a sentence or a text as a processing target, and the output corresponds to a demonstrative pronoun represented in the text.

The antecedent rear boundary candidate output unit 81 receives an input of a text and the rear boundary of an anaphor and outputs candidates for the antecedent rear boundary used for determining whether there is an anaphoric relation to the anaphora determining unit 82 by using the text and the rear boundary of the anaphor. The antecedent rear boundary candidate output unit 81 includes a previous position storing area 85 that is used for storing the output candidate for the antecedent rear boundary. The antecedent rear boundary candidate output unit 81 outputs candidates for the antecedent rear boundary by referring to the previous position storing area 85 in response to a processing request transmitted from the anaphora determining unit 82 and the antecedent morpheme sequence inferring unit 83 to be described later.

The anaphora determining unit 82 is acquired by applying the entire or a part of the function of the above-described determination processing unit 70 to the application. The anaphora determining unit 82 receives an input of a text and the position of a morpheme output by the antecedent rear boundary candidate output unit 81 as the candidate for the antecedent rear boundary corresponding to the anaphor rear boundary that is input in relation with the text. The anaphora determining unit 82, by using the text and the candidate for the antecedent rear boundary, determines whether there is an anaphoric relation by using the above-described weight vector and outputs a determination result that indicates the determination result as a binary value. Described in more detail, the anaphora determining unit 82 outputs a determination result indicating "False" in a case where it is determined that there is no anaphoric relation and outputs a determination result indicating "True" in a case where it is determined that there is an anaphoric relation. In addition, the anaphora determining unit 82 transmits a processing request to the antecedent rear boundary candidate output unit 81 in a case where it is determined that there is no anaphoric relation and further outputs the position of the morpheme as the antecedent rear boundary in a case where it is determined that there is an anaphoric relation.

The antecedent morpheme sequence inferring unit 83 receives an input of the antecedent rear boundary that is the position of the morpheme output in a case where it is determined that there is a anaphoric relation and infers the antecedent front boundary used for determining the range of the antecedent by using the antecedent rear boundary. The antecedent morpheme sequence inferring unit 83 includes an application validness evaluation determining plugin 84. Here, the application validness evaluation determining plugin 84 infers the front boundary used for determining the range of the antecedent that coincides with the purpose of the application by using the input antecedent rear boundary. The application validness evaluation determining plugin 84 is a plugin module that determines whether or not the range of the antecedent that is determined by the input antecedent rear boundary and the inferred antecedent front boundary is valid for the application. The application validness evaluation determining plugin 84 may be interchanged for each application. As examples thereof, there are a plugin module that performs a determination process for determining whether or not the antecedent is within ten characters, a plugin module that determines whether or not the antecedent includes an NG word, and the like. The application validness evaluation determining plugin 84 transmits a processing request to the antecedent rear boundary candidate output unit 81 in a case where the range of the antecedent is determined as not valid and outputs the antecedent rear boundary and the antecedent front boundary in a case where the range of the antecedent is determined as valid. In other words, the antecedent morpheme sequence inferring unit 83 infers the position of the antecedent front boundary that is used for determining the range of the antecedent that is determined as valid by the application validness evaluation determining plugin 84 as the front boundary used for determining the range of the antecedent that coincides with the purpose of the application.

Figure 12:
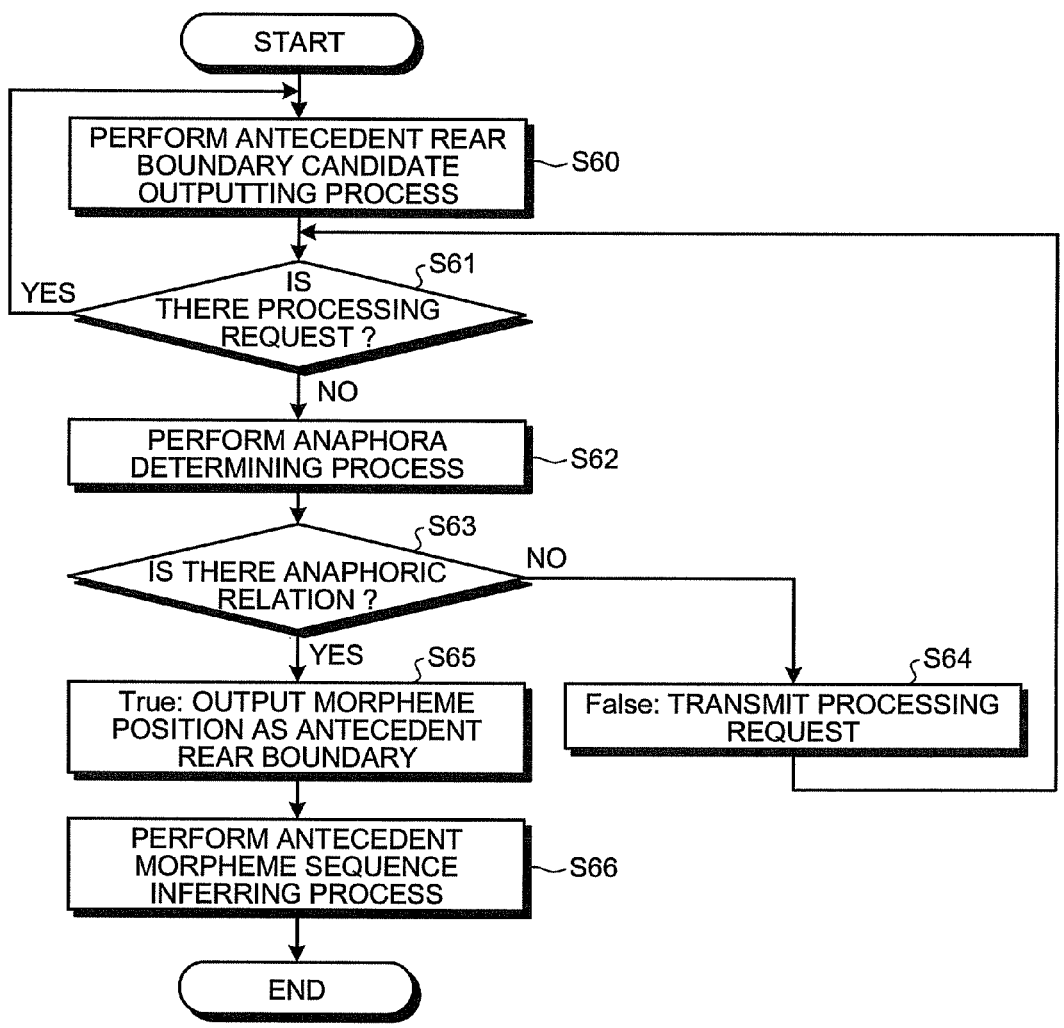
FIG. 12 is a flowchart illustrating the procedure of an antecedent determining process.

Next, the procedure of the antecedent determining process performed by the application system according to this embodiment will be described with reference to FIG. 12. When an input of a text as a processing target and an anaphor rear boundary is received, the application system, first, performs an antecedent rear boundary candidate output process by utilizing the function of the antecedent rear boundary candidate output unit 81 in Step S60. Described in more detail, the antecedent rear boundary candidate output unit 81 outputs the position of the morpheme (morpheme position) that is closest to the anaphor rear boundary in the text as a candidate for the antecedent rear boundary. At this time, the antecedent rear boundary candidate output unit 81 stores the output candidate for the antecedent rear boundary in the previous position storing area 85. Then, the antecedent rear boundary candidate output unit 81, next, performs the process of Step S60 in a case where a processing request has been transmitted from any one of the anaphora determining unit 82 and the antecedent morpheme sequence inferring unit 83 (Yes in Step S61). At this time, in Step S60, a position (morpheme position) that is apart from the morpheme position stored in the previous position storing area 85 by one morpheme is output as a candidate for the antecedent rear boundary. The processing requests transmitted from the anaphora determining unit 82 and the antecedent morpheme sequence inferring unit 83 are continuously transmitted. When the continuous processing request is transmitted, the antecedent rear boundary candidate output unit 81 sequentially outputs the morpheme position that is closest to the rear boundary of the anaphor to a morpheme position that is farthest from the rear boundary of the anaphor as a candidate for an antecedence rear boundary. Here, the farthest position is a morpheme located at the beginning of the sentence. The antecedent rear boundary candidate output unit 81 repeatedly performs the process of Step S60. Accordingly, the antecedent rear boundary candidate output unit 81 outputs the position of the morpheme (morpheme position) that is the closest out of the morphemes of which the position (morpheme position) has not been output once as a candidate for the antecedent rear boundary, as a candidate for the antecedent rear boundary in the text. In addition, in a case where a processing request is transmitted after the morpheme position of the morpheme located at the beginning of the sentence is output as the candidate for the antecedent rear boundary, the antecedent rear boundary candidate output unit 81 outputs "Null" meaning that there is no antecedent corresponding to the designated anaphor and ends the process in Step S60.

In addition, the application system performs the process of Step S60, and the process proceeds to Step S62 every time a candidate for the antecedent rear boundary is output. In Step S62, the anaphora determining unit 82 of the application system determines whether or not there is an anaphoric relation by using the input text and the morpheme position output as the candidate for the antecedent rear boundary in Step S60 and outputs a determination result indicating the result of the determination as a binary value. At this time, in a case where it is determined that there is no anaphoric relation (No in Step S63), the anaphora determining unit 82 outputs a determination result indicating "False" and transmits a processing request to the antecedent rear boundary candidate output unit 81 in Step S64. Thereafter, the process is returned to Step S61. On the other hand, in a case where it is determined that there is an anaphoric relation (Yes in Step S63), the anaphora determining unit 82 outputs a determination result indicating "True" and outputs the morpheme position as an antecedent rear boundary in Step S65. Thereafter, the process proceeds to Step S66.

In Step S66, the antecedent morpheme sequence inferring unit 83 of the application system performs an antecedent morpheme sequence inferring process by using the antecedent rear boundary output in Step S65. Described in more detail, the antecedent morpheme sequence inferring unit 83 infers a front boundary used for determining the range of the antecedent by using the antecedent rear boundary output in Step S65. The application validness evaluation determining plugin 84 of the antecedent morpheme sequence inferring unit 83 determines whether or not the range of the antecedent determined by the inferred front boundary and the antecedent rear boundary output in Step S65 is valid. Here, the detailed procedure of the process performed by the antecedent morpheme sequence inferring unit 83 and the application validness evaluation determining plugin 84 will be described with reference to FIG. 13. In Step S70, the antecedent morpheme sequence inferring unit 83 sets a morpheme position j at the same position of the antecedent rear boundary i output in Step S65. Here, j represents a candidate for a front boundary of an antecedent (antecedent front boundary). Thereafter, the antecedent morpheme sequence inferring unit 83 moves the morpheme position j to a morpheme position located to the front side by one morpheme in Step S71. The antecedent morpheme sequence inferring unit 83 determines whether or not j is a morpheme position located at the beginning of the sentence in Step S72 and outputs "No Match" in a case where j is the morpheme position located at the beginning of the sentence (Yes in Step S72). Thereafter, the process performed by the application system is returned to Step S60 illustrated in FIG. 12. On the other hand, in a case where j is not the morpheme position located at the beginning of the sentence (No in Step S72), the antecedent morpheme sequence inferring unit 83 outputs the range of the antecedent that is determined by i and j to the application validness evaluation determining plugin 84. The application validness evaluation determining plugin 84 determines the validness of the range of the antecedent in Step S73. Here, in a case where the application validness evaluation determining plugin 84 determines no validness of the range of the antecedent (No in Step S74), the process is returned to Step S71. On the other hand, in a case where the validness of the range of the antecedent is determined to be valid (Yes in Step S74), the application validness evaluation determining plugin 84 outputs the antecedent rear boundary and the antecedent front boundary in Step S75.

According to this embodiment, the range of an antecedent that coincides with the purpose of the application can be inferred and output.

In each of the above-described embodiments, it may be configured such that various programs executed by the coreference analysis device 50 are provided by being stored in a computer connected to a network such as the Internet and downloaded through the network. In addition, it may be configured such that the various programs are recorded in a computer-readable recording medium such as a CD-ROM, a flexible disk (FD), a CD-R, or a digital versatile disk (DVD) as a file in an installable format or executable format so as to be provided as a computer program product.

In each of the above-described embodiments, the coreference analysis system may be configured such that an information processing device serving as the learning processing unit 60 is set as a learning processing device, and an information processing device serving as the determination processing unit 70 is set as a determination device. In such a case, the weight vector may be received by the determination device from the learning device, for example, through communication via a communication I/F and be stored or may be stored in the determination device in accordance with a user operation input through a storage medium or an operation input.

In each of the above-described embodiments, although an example has been described in which a coreference analysis for analyzing a coreference is performed, the embodiments are not limited thereto, and the coreference analysis device 50 according to each of the above-described embodiments can be applied to an anaphora analysis that analyzes other anaphora such as zero anaphora or associative anaphora.

In each of the above-described embodiments, the units included in the learning processing unit 60 included in the coreference analysis device 50 are not limited to the above-described example, and any one or more units may be configured so as to be integrated, or the function realized by any one of the units may be configured so as to be realized by a plurality of modules. This similarly applies to the determination processing unit 70.

In each of the above-described embodiments, although the rear boundary or the front boundary is designated in units of morphemes, the embodiments are not limited thereto, and, for example, the rear boundary or the front boundary may be designated in units of characters.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning device comprising:
    a memory that stores computer executable units; and
    a processor configured to execute the computer executable units stored in the memory;
    an input receiving unit, executed by the processor, that receives an input of training data representing a sentence, rear boundaries of elements having an anaphoric relation within the sentence, and a correspondence relation between elements that are an antecedent and an anaphor;
    a first generation unit, executed by the processor, that generates example data by using the training data, the example data representing a first rear boundary, a second rear boundary, and a label which indicates whether or not an element represented by the first rear boundary and an element represented by the second rear boundary have the anaphoric relation;
    an inferring unit, executed by the processor, that infers a range of the element represented by the first rear boundary and a range of the element represented by the second rear boundary by inferring front boundaries of the element represented by the first rear boundary and the element represented by the second rear boundary based on a predetermined rule and replaces the first rear boundary and the second rear boundary of the example data with texts of the inferred ranges to generate expanded example data;
    a second generation unit, executed by the processor, that generates a feature vector based on the expanded example data; and
    a learning unit, executed by the processor, that learns criteria through machine learning by using the feature vector, the criteria being a weight vector used for determining whether or not there is the anaphoric relation in an arbitrary sentence.

2. The learning device according to claim 1, further comprising:
    a plurality of the inferring units, executed by the processor, that infer the ranges by inferring the front boundaries based on the predetermined rules that are different from each other and generates a plurality of expanded example data;
    a plurality of the second generation units, executed by the processor, that generate a plurality of the feature vectors based on the plurality of the expanded example data; and
    an integration unit, executed by the processor, that integrates the plurality of the feature vectors, wherein the learning unit learns the criteria through machine learning by using the feature vectors that are integrated.

3. A determination device comprising:
    a memory that stores computer executable units; and
    a processor configured to execute the computer executable units stored in the memory;
    an input receiving unit, executed by the processor, that receives an input of user data representing a sentence and rear boundaries of elements that may have an anaphoric relation within the sentence;
    a first generation unit, executed by the processor, that generates example data by using the user data, the example data representing a rear boundary of a first element that is a candidate for an antecedent and a rear boundary of a second element that is a candidate for an anaphor;
    an inferring unit, executed by the processor, that infers a range of the first element and a range of the second element by inferring front boundaries of the first element and the second element based on a predetermined rule and replaces the rear boundary of the first element and the rear boundary of the second element of the example data with texts of the inferred ranges to generate expanded example data;
    a second generation unit, executed by the processor, that generates a feature vector based on the expanded example data; and
    a determination unit, executed by the processor, that determines whether or not there is the anaphoric relation between the first element and the second element based on the feature vector and predetermined criteria.

4. The determination device according to claim 3, further comprising:
    a plurality of the inferring units, executed by the processor, that infer the ranges of the first element and the ranges of the second element based on the predetermined rules that are different from each other and generate a plurality of the expanded example data;
    a plurality of the second generation units, executed by the processor, that generate a plurality of the feature vectors based on the plurality of the expanded example data; and
    an integration unit, executed by the processor, that integrates the plurality of the feature vectors,
    wherein the determination unit determines whether or not there is the anaphoric relation between the first element and the second element based on the feature vectors that are integrated and the criteria.

5. A learning method performed by a learning device, the learning method comprising:
- receiving, using a processor, an input of training data representing a sentence, rear boundaries of elements having an anaphoric relation within the sentence, and a correspondence relation between elements that are an antecedent and an anaphor;
- generating, using the processor, example data by using the training data, the example data representing a first rear boundary, a second rear boundary, and a label which indicates whether or not an element represented by the first rear boundary and an element represented by the second rear boundary have an anaphoric relation;
- inferring, using the processor, a range of the element represented by the first rear boundary and a range of the element represented by the second rear boundary by inferring front boundaries of the element represented by the first rear boundary and the element represented by the second rear boundary based on a predetermined rule;
- replacing, using the processor, the first rear boundary and the second rear boundary of the example data with texts of the inferred ranges to generate expanded example data;
- generating, using a processor, a feature vector based on the expanded example data; and
- learning, using the processor, criteria through machine learning and by using the feature vector, the criteria being a weight vector used for determining whether or not there is the anaphoric relation in an arbitrary sentence.

6. A determination method performed by a determination device, the determination method comprising:
- receiving, using a processor, an input of user data representing a sentence and rear boundaries of elements that may have an anaphoric relation within the sentence;
- generating, using the processor, example data by using the user data, the example data representing a rear boundary of a first element that is a candidate for art antecedent and a rear boundary of a second element that is a candidate for an anaphor;
- inferring, using the processor, a range of the first element and a range of the second element by inferring front boundaries of the first element and the second element based on a predetermined rule;
- replacing, using the processor, the rear boundary of the first element and the rear boundary of the second element of the example data with texts of the inferred ranges to generate expanded example data;
- generating, using the processor, a feature vector based on the expanded example data; and
- determining, using the processor, whether or not there is the anaphoric relation between the first element and the second element based on the feature vector and predetermined criteria.

7. A computer program product having a non-transitory computer readable medium including instructions for learning criteria, wherein the instructions, when executed by a computer, cause the computer to perform:
- receiving an input of training data representing a sentence, rear boundaries of elements having an anaphoric relation within the sentence, and a correspondence relation between elements that are an antecedent and an anaphor;
- generating example data by using the training data, the example data representing a first rear boundary, a second rear boundary, and a label which indicates whether or not an element represented by the first rear boundary and an element represented by the second rear boundary have the anaphoric relation;
- inferring a range of the element represented by the first rear boundary and a range of the element represented by the second rear boundary by inferring front boundaries of the element represented by the first rear boundary and the element represented by the second rear boundary based on a predetermined rule;
- replacing the first rear boundary and the second rear boundary of the example data with texts of the inferred ranges to generate expanded example data;
- generating a feature vector based on the expanded example data; and
- learning criteria through machine learning by using the feature vector, the criteria being a weight vector used for determining whether or not there is the anaphoric relation in an arbitrary sentence.

8. A computer program product having a non-transitory computer readable medium including instructions for determining whether or not there is an anaphoric relation, wherein the instructions, when executed by a computer, cause the computer to perform:
- receiving an input of user data representing a sentence and rear boundaries of elements that may have an anaphoric relation within the sentence;
- generating example data by using the user data, the example data representing a rear boundary of a first element that is a candidate for an antecedent and a rear boundary of a second element that is a candidate for an anaphor;
- inferring a range of the first element and a range of the second element by inferring front boundaries of the first element and the second element based on a predetermined rule;
- replacing the rear boundary of the first element and the rear boundary of the second element of the example data with texts of the inferred ranges to generate expanded example data:
- generating a feature vector based on the expanded example data; and
- determining whether or not there is the anaphoric relation between the first element and the second element based on the feature vector and predetermined criteria.

* * * * *